(12) United States Patent
Chanda et al.

(10) Patent No.: US 11,910,048 B2
(45) Date of Patent: *Feb. 20, 2024

(54) SYNCHRONIZING VIDEO CONTENT AMONG CLIENTS IN A COLLABORATION SYSTEM

(71) Applicant: Haworth, Inc., Holland, MI (US)

(72) Inventors: Rupen Chanda, San Francisco, CA (US); Yuri Kiryanov, Sammamish, WA (US)

(73) Assignee: Haworth, Inc., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/527,157

(22) Filed: Nov. 15, 2021

(65) Prior Publication Data
US 2022/0078507 A1  Mar. 10, 2022

Related U.S. Application Data

(63) Continuation of application No. 16/845,983, filed on Apr. 10, 2020, now Pat. No. 11,178,446.

(60) Provisional application No. 62/987,210, filed on Mar. 9, 2020.

(51) Int. Cl.
  *H04N 21/43* (2011.01)
  *H04N 21/242* (2011.01)
  *H04N 21/845* (2011.01)

(52) U.S. Cl.
  CPC ....... *H04N 21/4307* (2013.01); *H04N 21/242* (2013.01); *H04N 21/8456* (2013.01)

(58) Field of Classification Search
  CPC ............. H04N 21/4307; H04N 21/242; H04N 21/8456
  See application file for complete search history.

(56) References Cited

U.S. PATENT DOCUMENTS

| 9,401,080 B2 | 7/2016 | Rachamadugu |
| 10,304,037 B2 | 5/2019 | Foley et al. |
| 11,178,446 B2 | 11/2021 | Kiryanov et al. |

(Continued)

FOREIGN PATENT DOCUMENTS

| WO | 2016179401 A1 | 11/2016 |
| WO | 2020048617 A1 | 3/2020 |

OTHER PUBLICATIONS

CA 3,111,291—Office Action dated Mar. 30, 2022, 4 pages.
(Continued)

*Primary Examiner* — Randy A Flynn
(74) *Attorney, Agent, or Firm* — Haynes Beffel & Wolfeld LLP; Andrew L. Dunlap; Franklin M. Schellenberg

(57) ABSTRACT

Systems and techniques are provided for synchronizing playback of a video at a plurality of client-side nodes in a network including a server-side node and the plurality of client-side nodes. The system includes logic to receive a sync video message at the server from a first client-side node identifying a sync event time. The system includes logic to map the sync event time at the server to a sync frame identifier. The server sends a follower sync video message to a follower set of one or more other client-side nodes including the sync frame identifier. In response to the follower sync video message the one or more client-side nodes in the follower set can synchronize playing the video at a frame corresponding to the sync frame identifier.

20 Claims, 20 Drawing Sheets

(56) References Cited

U.S. PATENT DOCUMENTS

| | | | |
|---|---|---|---|
| 2006/0174312 A1* | 8/2006 | Ducheneaut | H04N 21/242 725/138 |
| 2007/0107032 A1* | 5/2007 | Rachamadugu | G08B 13/19613 725/115 |
| 2008/0209021 A1* | 8/2008 | Shamma | H04N 21/4147 709/223 |
| 2009/0251599 A1* | 10/2009 | Kashyap | H04N 21/6582 348/E5.009 |
| 2010/0017474 A1* | 1/2010 | Kandekar | H04N 21/4312 709/205 |
| 2011/0196918 A1* | 8/2011 | Kkunigita | H04N 21/242 709/203 |
| 2012/0033616 A1* | 2/2012 | Sun | H04L 67/04 370/328 |
| 2012/0082424 A1* | 4/2012 | Hubner | H04N 21/242 386/E5.032 |
| 2013/0097257 A1* | 4/2013 | Jorakuji | H04N 21/2543 709/206 |
| 2013/0251329 A1* | 9/2013 | McCoy | H04N 21/44004 386/E5.032 |
| 2014/0222916 A1* | 8/2014 | Foley | G06F 16/176 709/204 |
| 2015/0095512 A1 | 4/2015 | Ali et al. | |
| 2015/0095962 A1* | 4/2015 | Kim | H04N 21/2665 725/110 |
| 2016/0156950 A1* | 6/2016 | Bangma | H04N 21/43 725/116 |
| 2016/0328114 A1* | 11/2016 | Santhakumar | G06F 9/451 |
| 2019/0121498 A1 | 4/2019 | Jakobovits et al. | |

OTHER PUBLICATIONS

Martin Ekuan et al., "Cloud Design Patterns", Microsoft.com, Azure Architecture Center | Microsoft Learn, Apr. 13, 2023, 6 pgs, [downloaded Aug. 16, 2023 from <https://learn.microsoft.com/en-us/azure/architecture/patterns/>].

"Index Table pattern", Microsoft.com, Azure Architecture Center | Microsoft Learn, Jul. 28, 2022, 8 pgs, [downloaded Aug. 16, 23 from <https://learn.microsoft.com/en-us/azure/architecture/patterns/index-table>].

* cited by examiner

EXAMPLES OF INDEX TABLE

Table 301:

| Frame Identifier | Display Time Stamp (milli seconds) |
|---|---|
| 1 | 0.000000 |
| 2 | 0.033367 |
| 3 | 0.066733 |
| 4 | 0.100100 |
| 5 | 0.133467 |
| 6 | 0.166834 |
| 7 | 0.200200 |
| 8 | 0.233567 |
| 9 | 0.266934 |
| 10 | 0.300300 |
| 11 | 0.333667 |
| 12 | 0.367034 |
| 13 | 0.400400 |
| 14 | 0.433767 |
| 15 | 0.467134 |

Table 311:

| Frame Identifier | Display Time Stamp (milli seconds) |
|---|---|
| 1 | 0.000000 |
| 2 | 0.033333 |
| 3 | 0.066667 |
| 4 | 0.100000 |
| 5 | 0.166667 |
| 6 | 0.200000 |
| 7 | 0.233333 |
| 8 | 0.266667 |
| 9 | 0.300000 |
| 10 | 0.333333 |
| 11 | 0.366667 |
| 12 | 0.433333 |
| 13 | 0.466667 |
| 14 | 0.500000 |
| 15 | 0.533333 |
| 16 | 0.566667 |

FIG. 3

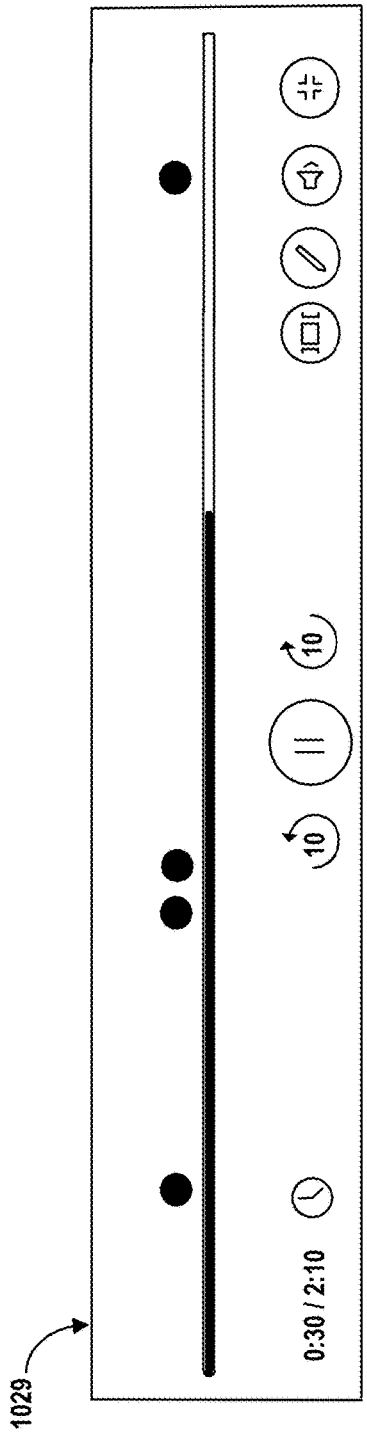

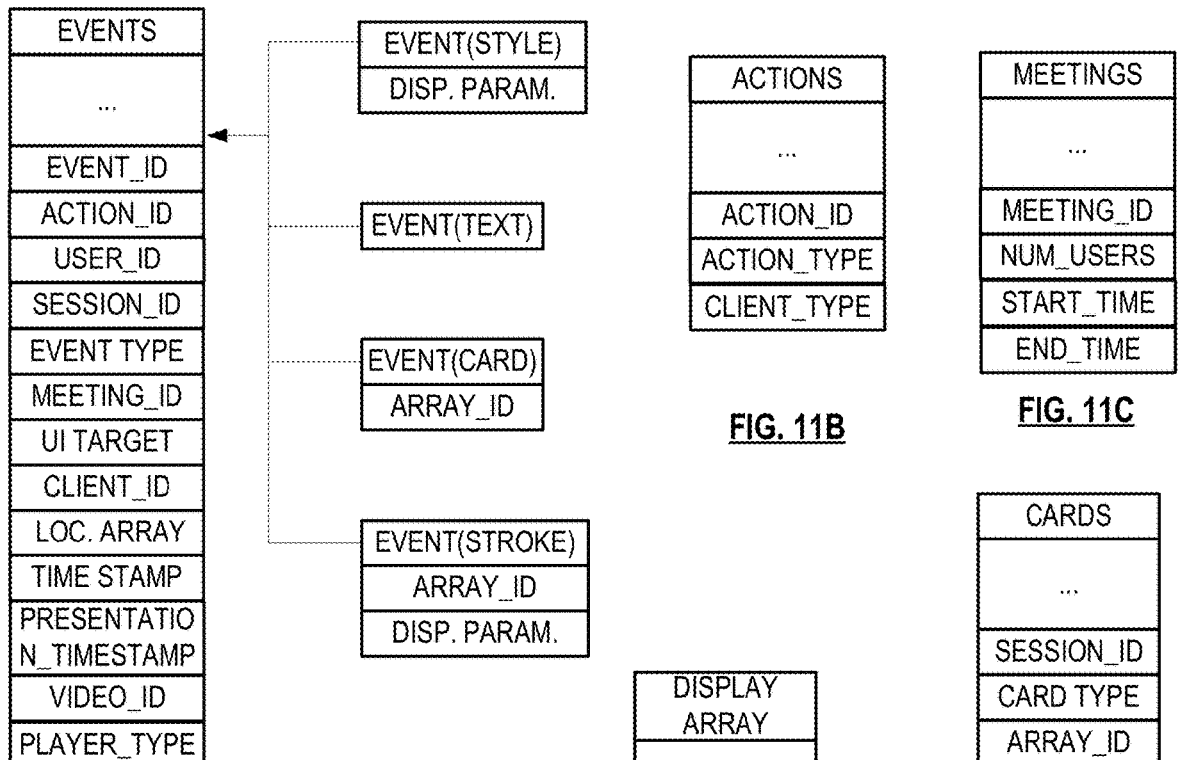
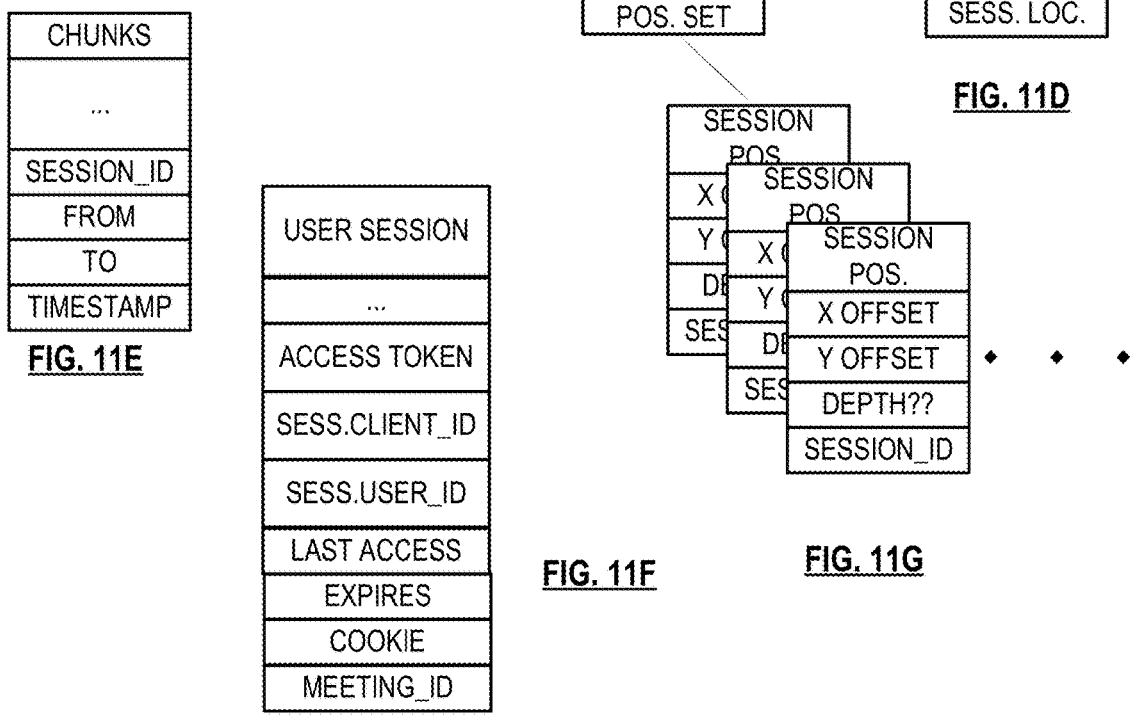

SYNCHRONIZING VIDEO CONTENT AMONG CLIENTS IN A COLLABORATION SYSTEM

CROSS-REFERENCE TO OTHER APPLICATIONS

The present application is a continuation of U.S. application Ser. No. 16/845,983 filed on Apr. 10, 2020, titled "SYNCHRONOUS VIDEO CONTENT COLLABORATION ACROSS MULTIPLE CLIENTS IN A DISTRIBUTED COLLABORATION SYSTEM," which claims benefit of U.S. Provisional Application No. 62/987,210 filed on Mar. 9, 2020, titled "SYNCHRONOUS VIDEO CONTENT COLLABORATION ACROSS MULTIPLE CLIENTS IN A DISTRIBUTED COLLABORATION SYSTEM". The priority applications are incorporated by reference herein in their entireties.

BACKGROUND

Field

The present invention relates to collaboration systems that enable users to participate in collaboration meetings from multiple locations. More specifically, the present invention relates to synchronous video content playback across multiple clients in a collaboration meeting.

Description of Related Art

Collaboration systems are used in a variety of environments to allow users to contribute and participate in content generation and review. Users of collaboration systems can join collaboration sessions (or collaboration meetings) from remote locations around the globe. A participant in a collaboration session can share digital assets (or content) with other participants in the collaboration session, using a digital whiteboard. The digital assets can include documents, spreadsheets, slide decks, images, videos, line drawings, annotations, etc. Video content is commonly reviewed in collaboration sessions. To achieve a high-quality video playback on clients, the videos can be downloaded or streamed on each client and played in a video player within the collaboration workspace. The collaboration often requires participants to pause video to review content at a certain frame. Due to network latencies, drift in clocks of different clients from network clock, and manual video controls, it is difficult to pause the video at a certain frame on all clients participating in the collaboration session. For example, a meeting participant in Los Angeles, may ask meeting other participants in the collaboration session to pause their videos when the video is playing a certain frame on her display client. The other participants located in Hong Kong and New York may have different frames on their display client when they hear the instructions from the participant in Los Angeles. Thus, by the time they pause their videos, the video player on their display clients may be at different frames than the participant in Los Angeles. A difference of a few frames (such as two or three frames) can often change the context of content in a video.

It is desired to provide a system that can reduce inefficiencies in collaboration meetings that include reviewing video content. The inefficiencies can be caused by manual attempts of participants to seek a particular frame in a video for discussion and review. Therefore, an opportunity arises to automatically synchronize the playback of videos at different clients in a collaboration session such that all clients are presented the same frame as the participant who is leading the collaboration session.

SUMMARY

A system and method for operating a system are provided for synchronizing playback of a video at the plurality of client-side nodes in a network including a server at one or more server-side nodes and a plurality of client-side nodes at which display of the video can be executed.

In embodiments describe herein, the system can be referred to as digital collaboration workspace system, including a collaboration system configured for displaying views of a collaboration workspace on interactive displays, such as touch screens or other graphical user interface displays, in the plurality of client-side nodes.

Technology described herein includes a system in which a server coordinates with clients at a plurality of client-side nodes using an application program interface API, that comprises a set of parameters exchanged by messaging among the nodes, and a set of procedures to coordinate display of the video in the plurality of client-side nodes. The API can include resources supporting a group of actions including play video, pause video, resume video, seek video, stop video, load video, unload video, and sync video for coordinated play of the video at participating client-side nodes.

In an embodiment described herein, a server can receive a play video message from a first client-side node, designated a leader node, identifying a play video event including a play event time corresponding to a time of a user input at the first client-side node to start play of a video at the first client-side node. The server includes the logic to map the play event time to a starting frame identifier. The server sends a follower play video message to a follower set of one or more other client-side nodes identifying the play video event and including the starting frame identifier. The one or more other client-side nodes in the follower set can start playing the video at a frame corresponding to the starting frame identifier, in response to the follower play video message from the server. The server includes logic to receive a sync video message from the first client-side node identifying a sync video event including a sync event time corresponding to a time of a sync event at the first client-side node. The server includes logic to map the sync event time to a sync frame identifier. The server sends a follower sync video message to the follower set of one or more other client-side nodes identifying the sync video event and including the sync frame identifier. The one or more other client-side nodes in the follower set can synchronize playing the video at a frame corresponding to the sync frame identifier in response to the follower sync video message from the server.

The server can include logic to receive a load video message from a first client-side node in the plurality of client-side nodes identifying a load video event including an identifier of a video. The server can then send a follower load video message to the client-side nodes in the plurality of client-side nodes, the follower load video message including data identifying the video. The video can be downloaded at the client-side nodes in response to the follower load video message from the server.

The server can include logic to receive acknowledgement messages from client-side nodes in the plurality of client-side nodes after sending the follower load video message. A follower set of one or more other client-side nodes can be designated at client-side nodes which respond with acknowledgement messages within a pre-determined cut-off time interval.

The system can include logic to compose an index table of relative display times to frame identifiers (or frame numbers) for the video in response to the load video event, relative to a first frame or to some other particular identifiable frame of the video. The mapping can include using the index table to map the play event time and the sync event time to the starting frame identifier and the sync frame identifier, respectively. The index table can store relative display times of frames in the video.

The system can include logic to store an index table of relative display times to frame identifiers for the video. The mapping can include using the index table to map the play event time and the sync event time to the starting frame identifier and the sync frame identifier, respectively. the index table can store relative display time of frames in the video. The index table can be generated once per video in some embodiments and stored in the index table database. The stored index table can used for subsequent synchronized playback of the video. The same index table in some embodiments can be used to synchronize the playback of all followers.

The collaboration system configured for displaying views of a collaboration workspace on an interactive workspace display or an interactive display in a network can include a server-side node and a plurality of client-side nodes. The system can include logic to retrieve at the client-side node and from the server-side node, at least part of a log of entries to identify events in the collaboration workspace. The events identified by the entries in the log being related to graphical targets having virtual coordinates within the workspace. The workspace can include a graphical object representing the video distributed at virtual coordinates within the collaboration workspace. An entry in the log, which identifies an event, comprises data specifying virtual coordinates of a location within the workspace of the graphical target related to the event, a target identifier of the graphical target related to the event to be displayed when rendered on a display of the client-side node. The entry in the log of entry can include data identifying an action selected from a group of actions including play video, pause video, resume video, seek video, stop video, load video, unload video, and sync video of the graphical target within the workspace. The system can include mapping a displayable area in physical display space at the client-side node to a mapped area within the workspace, to identify events in the retrieved log having locations within the mapped area. The system can include logic to render graphical targets, including the graphical object representing the video, identified by the identified events onto the displayable area.

Methods and computer program products which can be executed by computer systems are also described herein.

Other aspects and advantages of the present invention can be seen on review of the drawings, the detailed description and the claims, which follow.

BRIEF DESCRIPTION OF THE DRAWINGS

The invention will be described with respect to specific embodiments thereof, and reference will be made to the drawings, which are not drawn to scale, and in which:

FIG. 3 presents examples of index table including frame identifiers and respective display times (or display time stamps).

FIGS. 10A to 10D (collectively FIG. 10) illustrate examples of user interface controls for a video player for synchronized playback of a video.

FIGS. 11A-11G (collectively FIG. 11) are simplified diagrams of data structures for parts of the workspace and display mappings data.

DETAILED DESCRIPTION

A detailed description of embodiments of the present invention is provided with reference to the FIGS. 1-15.

The following description is presented to enable any person skilled in the art to make and use the invention and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

We describe a collaboration environment in which users can participate in an interactive collaboration from the same meeting room or from locations across the world. A participant can join and participate in the collaboration using large format digital displays, desktop and laptop computers, tablets, or mobile computing devices. Collaboration systems are used in a variety of environments to allow users to contribute and participate in content generation and review.

A participant in a collaboration session can share digital assets (or content) with other participants in the collaboration session using a digital whiteboard. The digital assets can include documents, spreadsheets, slide decks, images, videos, line drawings, annotations, etc. Following the description of this example collaboration environment, we explain how the technology disclosed addresses the problem of synchronized playback of video content on multiple clients in the collaboration meeting. To achieve high quality video playback on clients, the videos can be downloaded or streamed on each client and played in a video player within the collaboration workspace. The collaboration often requires participants to pause video at a certain frame to review content. If one participant of the collaboration meeting (or collaboration session) asks other participants to pause videos at their respective devices, by the time the participants pause videos at their respective devices, the videos on their respective devices may have moved to a different frame. A difference of a few frames can often change the context in a video. We present details of the technology disclosed for synchronized playback of video content across multiple clients in a distributed collaboration system. We then present description of various elements of the technology disclosed to enable the reader to understand features of these elements. The details of the technology disclosed are illustrated using examples of collaboration workspaces.

Figure 1A:
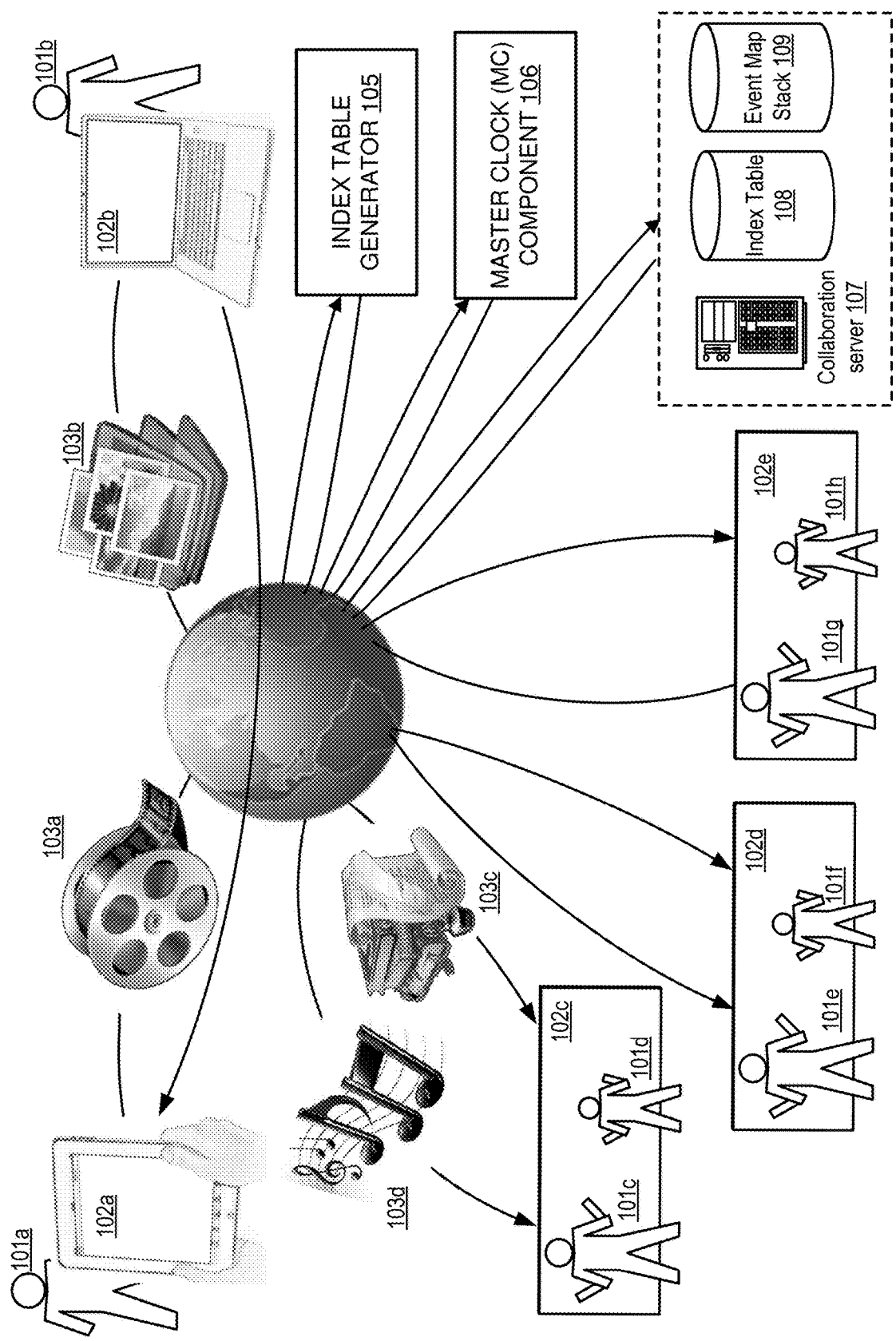
FIGS. 1A and 1B (collectively FIG. 1) illustrate example aspects of a digital collaborative workspace system also referred to as digital display collaboration system or a collaboration system.

FIG. 1A illustrates example aspects of a digital collaborative workspace system also referred to as digital collaboration system or a collaboration environment. In the example, a plurality of users 101*a-h* (collectively 101), may desire to collaborate with each other in creation or review of complex images, music, video, documents, and/or other media, all generally designated in FIG. 1A as 103*a-d* (collectively 103). The users in the illustrated example use a variety of devices configured as client-side nodes, in order to collaborate with each other, for example a tablet 102*a*, a personal computer (PC) 102*b*, a mobile computing device (e.g., a mobile phone) 102*f* and many large format displays 102*c*, 102*d*, 102*e* (collectively devices 102). The client-side nodes can be positioned in locations around the world. In the illustrated example, the large format displays 102*c*, 102*d*, and 102*e* which are sometimes referred to herein as a "wall", accommodate more than one user, (e.g. users 101*c* and 101*d*, users 101*e* and 101*f*, and users 101*g* and 101*h*). The user devices, which are referred to as client-side nodes, have displays on which a displayable area is allocated for displaying events in a workspace. The displayable area for a given user may comprise the entire screen of the display, a subset of the screen, a window to be displayed on the screen and so on, such that each has a limited area or extent compared to the virtually unlimited extent of the workspace.

The large format displays 102*c*, 102*d*, 102*e* sometimes referred to herein as "walls," are controlled by respective client-side network nodes, which in turn are in network communication with a central collaboration server 107 configured as a server-side network node. The server-side network node has access to a database 108 storing an index table and a database 109 storing spatial event stack for one or more workspaces.

As used herein, a network node, including network nodes referred to as client-side nodes and a server-side nodes, is an active electronic device that is attached to a network, and is capable of sending, receiving, or forwarding information in support of computer programs such as servers and clients, over a physical media for a communications channel on the network, and having for example media access control addresses and protocol stacks that support higher network layers. A network can include the networks using Internet Protocol addresses, or other type of network layer addresses. In some embodiments the network comprises the Internet. Examples of electronic devices which can be deployed as network nodes, include all varieties of computers, workstations, laptop and desktop computers, hand-held computers and smart phones. Network nodes comprise processors that include of have access to memory storing computer programs such as servers and clients as described herein executable by such processors. The digital displays 102*c* and 102*d* are also examples of network nodes. Throughout this document digital displays client devices, etc., can simply be referred to as "network nodes", "client-side nodes" and/or "server-side nodes."

As used herein, the term "database" does not necessarily imply any unity of structure. For example, two or more separate databases, when considered together, still constitute a "database" as that term is used herein.

The collaboration workspace technology described above can be used for collaboration in a wide variety of environments. For example, the technology can be used to conduct collaboration meetings in an enterprise environment in which employees of an organization or other groups participate from one or more office locations or remote locations around the world, simultaneously and at different times, by interacting with a collaboration workspace in the same or different virtual locations. Also, the collaboration technology can be used in an educational environment such as to deliver a lecture in one or more lecture theaters and remote locations. The teacher and students can connect to the collaboration meeting using their respective computing devices from one or more lecture theaters or remote locations around the world. The participants in a collaboration meeting can perform a variety of interactive tasks in the workspace. For example, a first user at a first client-side node (designated a leader) can send a message to server to load a video in the workspace and play the video in a video player, in a synchronized manner such that the video playback at the follower set of one or more other client-side nodes in the collaboration session are synchronized to video playback of the first client-side node (also referred to as a leader or a leader client-side node). The first client-side node can also send message to server to pause the video to review the contents of a paused frame with other participants. The technology disclosed includes the logic to pause the videos on follower set of one or more other client-side nodes at a frame corresponding the frame paused in the video player of the first client-side node.

The collaboration environment can also include an index table generator 105 connected through the network. An index table can contain relative display times (also referred to as display time stamps) for frames in a video. The index table generator 105 can scan metadata information of frames in a video to extract their relative display times. The technology disclosed can use existing software tools to generate index table. Examples of such tools include FFProbe, MP4Box, etc. The videos can be stored in a variety of file formats such as MP4, AVI, WMV, etc. The index table generator can parse video files and identify relative display time of frames from the header data of the frames. An example of display times is referred to as presentation time stamp of frames in a video. In this case, the display time corresponds to a display time of the frame in the video. Presentation time stamps (PTS) are sequential times in which the frames in video are displayed. However, some frames in a video can be stored earlier than their position in the display sequence represented by a decoding time stamp (DTS). There can be three different frame types (or picture types) in a video. A first type referred to as I-frames (or key frames) are least compressible and do not require other video frames to decode. P-frames can use data from previous frames to decompress and are more compressible than I-frames. B-frames can use both previous and following (or forward) frames for data reference to get highest amount of data compression. If there is a B-frame in a video, the frame following the B-frame is stored earlier than B-frame, but it can have presentation time stamp value that is later in the sequence than the presentation time stamp of B-frame. The technology disclosed uses the display times (such as presentation time stamps) to enable synchronized video playback at multiple clients in a collaboration meeting. The index table generator can include parser to parse the video files of different file formats and extract display times for frames. In one example, the index table generator extracts time stamps for all frames in the video. In another example, the index table generator can extract time stamps for key frames (or I-frames) in the video. The master clock (MC) component 106 can include logic to store the index table generated by the index table generator 105 in an index table database 108. The MC component can also include logic to access the stored index table in the database 108 for synchronized playback of video content across multiple clients in a collaboration meeting. Note that if an index table is generated for a video in a collaboration meeting, the same index table can used for synchronized playback of the same video in subsequent collaboration meetings i.e., the index table does not need to be generated every time a video is played in a synchronized manner.

A collaboration meeting (or collaboration session) can include many clients from locations around the world. The collaboration meeting may require review of video content. For high quality video playback, the video can be downloaded to client-side nodes for playback in their respective video players. However, it is difficult to synchronize the playback of the video across multiple clients in the collaboration meeting. The collaboration often requires participants to pause video to review content at a certain frame. Due to network latencies, drifts in clocks of client nodes from network clock, and manual video controls, it is difficult to pause the video at a certain frame on all clients participating in the collaboration session. For example, a meeting participant in Los Angeles, may ask meeting other participants in the collaboration session to pause their videos when the video is playing a certain frame on display. The other participants located in Hong Kong and New York may have different frames on display at their client-side nodes when they hear the instructions from the participant in Los Angeles. Thus, by the time they pause their videos, the video player on their display clients may be at different frames than the participant in Los Angeles. A difference of a few frames (such as two or three frames) can often change the context of content in a video.

The technology disclosed includes logic implemented in the master clock (MC) component 106 to synchronize the playback of videos of a follower set of clients to a first client (or a leader client). The MC component includes logic to receive video messages from the first client-side node and then send follow messages to the follower set of client-side nodes. The follower set of client-side nodes include the logic to receive the follow messages and synchronize the playback of video at their respective client-side nodes to the playback of the video of at the first client-side node. The examples of video messages from the first client-side node can include play video message, pause video message, sync video message, load video message, seek video message, resume video message and stop video message. These video messages can identify video events, for example, play video event, pause video event, sync video event, load video event, seek video event, resume video event, and stop video event, respectively. The video events can include event times, for example, play video time, pause video time, sync video time, load video time, seek video time, resume video time, and stop video time of respective events at the first client-side node (or the leader client). The event times however, may not precisely identify the frame in the video that has a display time corresponding to the event time. This is because the video players often generate the event time for an event by using approximate distance of the current position of the scrubber and convert it to a time indicating relative display time. The video players often do not have access to frame metadata in the video and hence cannot determine the display time of the frame from the metadata. The technology disclosed includes logic to map the video event times to frame identifiers in the video. The system determines this mapping using the index table of relative display times to frame identifiers in the video. The system can then send the frame identifiers to the follower set of one or more client-side nodes in the plurality of client-side nodes to synchronize the video playback at the follower client-side nodes to the first client-side node (or the leader client-side node). In another embodiment, the system can send the relative display times (such as presentation time stamps) of frame identifiers to the follower set of one or more other client-side nodes to synchronize the video playback. The technology disclosed can perform this synchronized video playback for a variety of video file formats e.g., MP4, AVI, etc.

Therefore, the technology disclosed enables efficient reviews of video content in collaboration meetings and provides an efficient process to synchronize the videos of follower set of one or more other client-side nodes to a leader client-side node. The system includes logic to change a follower client-side node to a leader client-side node during a collaboration session. The leader client-side node can then become one of the follower client-side nodes. In the following sections, we present some key elements of the collaboration system before describing the details of the synchronous video content collaboration across multiple client-side nodes.

Workspace

In order to support an unlimited amount of spatial information for a given collaboration session, we provide a way to organize a virtual space termed the "workspace". The workspace can be characterized by a multi-dimensional and in some cases two-dimensional plane with essentially unlimited extent in one or more dimensions for example, in such a way that new content can be added to the space. The content can be arranged and rearranged in the space, and a user can navigate from one part of the space to another. The workspace can also be referred to as a "container" in the sense it is a data structure that can contain other data structures or links to other objects or data structures. Digital assets (or objects) such as videos are arranged on the workspace. The videos can be played using a variety of available video players.

Viewport

One or more digital displays in the collaboration session can display a portion of the workspace, where locations on the display are mapped to locations in the workspace. A mapped area, also known as a viewport within the workspace is rendered on a physical screen space. Because the entire workspace is addressable using coordinates of locations, any portion of the workspace that a user maybe viewing itself has a location, width, and height in coordinate space. The concept of a portion of a workspace can be referred to as a "viewport". The coordinates of the viewport are mapped to the coordinates of the screen space. The coordinates of the viewport can be changed which can change the objects contained within the viewport, and the change would be rendered on the screen space of the display client. Details of workspace and viewport are presented in our United States Application Publication No. US 2019/0121498A1, entitled, "Virtual Workspace Including Shared Viewport Markers in a Collaboration System," filed Oct. 23, 2017, published on 25 Apr. 2019, which is incorporated by reference as if fully set forth herein.

Spatial Event Map

The "unlimited workspace" problem includes the need to track how people and devices interact with the workspace over time. In order to solve this problem, we have created what we call a "spatial event map". The spatial event map contains information needed to define objects and events in a workspace. It is useful to consider the technology from the point of view of space, events, maps of events in the space, and access to the space by multiple users, including multiple simultaneous users.

A spatial event map contains content in the workspace for a given collaboration session. The spatial event map defines arrangement of digital assets (or objects) on the workspace. Their locations in the workspace are important for performing gestures. The spatial event map contains information needed to define digital assets, their locations, and events in the workspace. A spatial events map system, maps portions of workspace to a digital display e.g., a touch enabled display. Details of workspace and spatial event map are presented in our U.S. Pat. No. 10,304,037, which is incorporated by reference as if fully set forth herein.

The video content collaboration technology can include adding annotations on video frames. For example, when the leader pauses the video at a certain frame to discuss the content with participants, the technology disclosed displays the same frame on the video players of the participants in the meeting. The leader or other participants can annotate on the frame of the video. The annotations can be stored as events in the spatial event map. When a participant of the meeting reviews the video at a later time, the annotations linked to specific frames can be found in the spatial event map or other log of the collaboration session, and can be rendered on the frame during the playback. In one embodiment, the technology disclosed can store the annotated frames as separate digital assets associated with the video. The technology disclosed can also include user interface elements that can indicate presence of annotations in a video.

The spatial event map contains information to define objects and events in a workspace. The spatial event map can be used to generate an event log or a log of entries which identifies an event comprising data specifying virtual coordinates of location within the workspace at which an interaction with the workspace is detected, data specifying a type of interaction, a graphical object associated with the interaction, and a time of the interaction. It is useful to consider the technology from the point of view of space, events, maps of events in the space, and access to the space by multiple users, including multiple simultaneous users. We now present description of these elements.

Space: In order to support an unlimited amount of spatial information for a given collaboration session, we provide a way to organize a virtual space termed the workspace, which can for example be characterized by a 2-dimensional plane (along X-axis and Y-axis) with essentially unlimited extent in one or both of the dimensions for example, in such a way that new content can be added to the space, that content can be arranged and rearranged in the space, that a user can navigate from one part of the space to another, and that a user can easily find needed things in the space when it is needed. The technology disclosed can also organize content on a 3-dimensional workspace (along X-axis, Y-axis, and Z-axis).

Events: Interactions with the workspace are handled as events. People, via tangible user interface devices, and systems can interact with the workspace. Events have data that can define or point to a target graphical object to be displayed on a physical display, and an action as creation, modification, movement within the workspace and deletion of a target graphical object, and metadata associated with them. Metadata can include information such as originator, date, time, location in the workspace, event type, and other metadata. In the technology disclosed, when a user interacts with a video object displayed on a workspace in a video player to play, pause, resume, seek, stop, load, unload, etc., the system generates an interaction event when a user produces an input signal that evokes a function of the video player, and for many kinds of touches on the workspace or gestures to interact with the workspace. Tracking events in a workspace enables the system to not only present the spatial events in a workspace in its current state, but to share it with multiple users on multiple displays, to share relevant external information that may pertain to the content, and understand how the spatial data evolves over time. Also, the spatial event map can have a reasonable size in terms of the amount of data needed, while also defining an unbounded workspace.

Map: A map of events in the workspace can include the sum total of discrete spatial events. When the persistent spatial events for a workspace are available, then that workspace can be "mapped" to a display or screen that has a displayable area of specific size, and that identifies a location or area in the workspace to be displayed in the displayable area.

Multi-User Access: One key characteristic is that all users, or multiple users, who are working on a workspace simultaneously, should be able to see the interactions of the other users in near-real-time way. The spatial event map allows users having displays at different physical locations to experience near-real-time events, including both persistent and ephemeral events, within their respective displayable areas, for all users on any given workspace.

Interaction events have data that can define or point to a target graphical object to be displayed on a physical display, and an action as creation, modification, movement within the workspace and deletion of a target graphical object, and metadata associated with them. Examples of graphical target objects can include video players that can be used to play video content. Metadata can include information such as originator, date, time, location in the workspace, event type, security information. The location in the workspace can be identified by virtual coordinates of location within the workspace at which an interaction with the workspace occurred. The technology disclosed includes the logic to map the local coordinates of the interaction at a client device to virtual coordinates in the workspace. The events metadata can also include the type of interaction. The system includes the logic to define various types of interactions, for example drawing, writing or annotating on the workspace; adding a digital asset such as a webpage, video, or a document; or moving/arranging objects on the workspace. The event metadata also includes logic to identify digital assets or objects associated with the interaction event. The event metadata can include the name and/or identifier of the organization where the system is deployed. The event metadata can also include the workspace identifier.

The event metadata can include information about the user who performed the event such as the location of the user and whether the user performed the event using a digital display wall, a laptop computer or a handheld device such as a tablet or a cell phone. Events can also be referred to as an activity. The system can also determine whether an event occurred during a multi-user collaboration, i.e. during a meeting in which two or more users participate or a single user collaboration also referred to as a single user collaboration meeting. The above event metadata information can be stored as part of the event metadata (also referred to as log of entries). We now describe a collaboration environment which can use the elements described above to enable synchronized video content playback across multiple client-side nodes in collaboration meetings.

There can be several different kinds of events in the system. Events can be classified as persistent events, also referred to as history events, that are stored permanently, or for a length of time required by the system for maintaining a workspace during its useful life. Events can be classified as ephemeral events that are useful or of interest for only a short time and shared live among other clients involved in the session. Persistent events may include history events stored in an undo/playback event stream, which event stream can be the same as or derived from the spatial event map of a session. Ephemeral events may include events not stored in an undo/playback event stream for the system. A spatial event map, or maps, can be used by a collaboration system to track the times and locations in the workspace in some embodiments of both persistent and ephemeral events on workspaces in the system.

Leader and Follower Model of Collaboration

The technology disclosed enables synchronous video content playback at different client-side nodes in a collaboration meeting. One of the participants in the collaboration meeting can be designated as a leader and the remaining participants are designated as followers. The leader and follower designation can change during the video content playback by receiving input from the participants. A follower can become a leader by providing an input via the user interface. One participant can be designated leader at any given time during the collaboration session. The playback of video content of the followers is synchronized to the playback of the video of the leader. The technology disclosed includes generating events from the leader and casting these events to the follower participants via an intermediary component. The events can be stored as part of spatial event map described above. The intermediary component includes the logic to synchronize the video playback of followers to the leader. An example of such an intermediary component is a master clock (MC) component 106 that can reside on a collaboration server 107. The intermediary component can also be referred to as media collaboration component. The follower participants receive messages from MC component and synchronize the video playback by matching the frame on their client to the current frame at the leader client.

The video content collaboration technology disclosed can be implemented by using the "follow mode" technique for identifying leaders and followers. An example of a "follow mode" technique is presented in our International Application No. PCT/US2016/031000, now published as WO 2016/179401, entitled, "Virtual Workspace Viewport Follow Mode and Location Markers in Collaboration Systems," filed May 6, 2015, which is incorporated by reference as if fully set forth herein. The leader client-side node can generate load, play, stop, pause, resume, seek, and sync actions or events. Other events may be generated by the leader client-side node and follower client-side nodes. The events are passed as application programmer interface (API) messages to MC component. The MC component receives the messages from leader client-side node and sends messages to follower set of client-side nodes in the collaboration session. Examples of API messages are presented below.

Figure 1B:
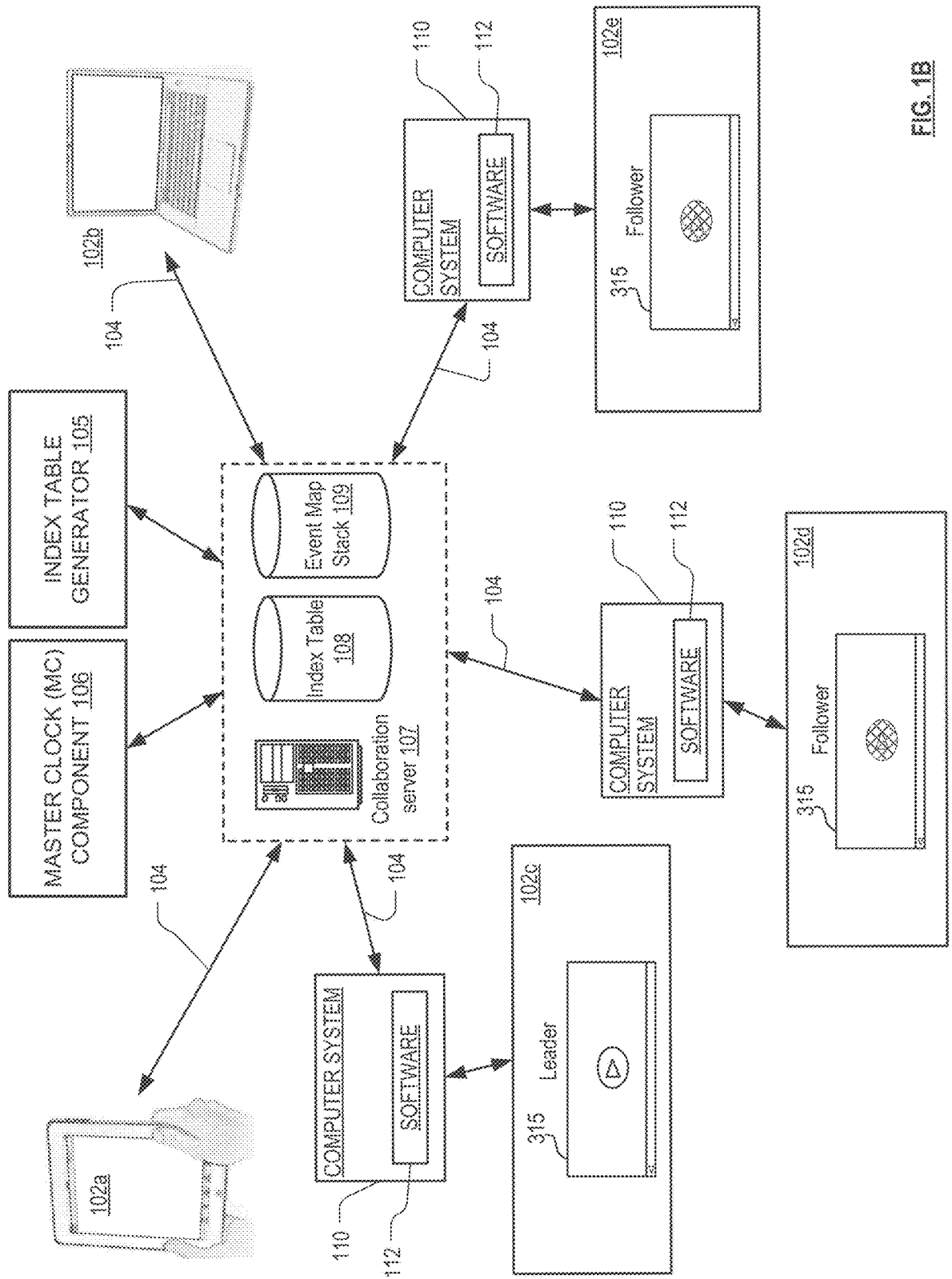

FIG. 1B illustrates the same environment as in FIG. 1A. The application running at the collaboration server 107 can be hosted using Web server software such as Apache or nginx. It can be hosted for example on virtual machines running operating systems such as LINUX. The server 107 is heuristically illustrated in FIG. 1B as a single computer. However, the server architecture can involve systems of many computers, each running server applications, as is typical for large-scale cloud-based services. The server architecture includes a communication module which can be configured for various types of communication channels, including more than one channel for each client in a collaboration. For example, near-real-time updates across the network, client software can communicate with the server communication module via using a message-based channel, based for example on the Web Socket protocol. For file uploads as well as receiving initial large volume workspace data, the client software can communicate with the server communication module via HTTP. The server can run a front-end program written for example in JavaScript and HTML using Node.js, support authentication/authorization based for example on Oauth, and support coordination among multiple distributed clients. The front-end program can be written using other programming languages and web-application frameworks such as in JavaScript served by Ruby-on-Rails. The server communication module can include a message-based communication protocol stack, such as a Web Socket application, that performs the functions of recording user actions in workspace data, and relaying user actions to other clients as applicable. This system can run on the node.JS platform for example, or on other server technologies designed to handle high-load socket applications.

The index table database 108 can be used to store the index tables for videos. The index table can store relative display times of frames in the video. The index table database 108 can store an index table per video that can be accessed when that video is downloaded for playback in a collaboration meeting, The system can use the index table to map event times (such as play event time, sync event time, etc.) to the frame identifiers (such as starting frame identifier, sync frame identifier, etc.). The system generates or composes the index table (also referred to as a time stamp table) by parsing the video files for display times of frames in the video. The system can use software tools as FFProbe multimedia stream analyzer (available at ffmpeg.org/ffprobe.html) from FFMpeg or a software tool MP4Box based on an open source project (available at gpac.wp.imt.fr/mp4box). Other video frame analysis tools can be applied by the technology disclosed to generate the index table. Several video file formats, such as MP4 file format store video files in the form of fragments. The fragments are groups of frames that start with a key frame (or I-frame) and include one or more delta frames (such as P or B frames). A fragment (also referred to as a box) contains a header metadata which identifies the starting frame of the fragment and the size of the fragment. The parser tools can parse metadata of one fragment including display times (such as presentation time stamps) and frame identifiers and then use the size parameter to jump to a next fragment (or box) in the video file to repeat the parsing process. The metadata extracted is used to generate the index table. The example software tool FFProbe can parse MP4 and AVI video file formats along with other video file formats. Other tools can be used to generate the index table for video files.

The system can store events in the event map stack database 109 in which the graphical object is a video player interface linked to a video, in which the video can be downloaded and played. In some examples, the metadata in an event linked to a video, can include information such as workspace identifier, display time stamp, frame identifier, video player identifier, video file identifier, etc. The event data can also include information about the client-side node which generated the event. This information can further identify whether the client-side node is a leader client or a follower client. The database 109 stores, for example, a digital representation of workspace data sets for a spatial event map of each session where the workspace data set can include or identify events related to objects displayable on a display canvas. A workspace data set can be implemented in the form of a spatial event stack, managed so that at least persistent spatial events are added to the stack (push) and removed from the stack (pop) in a first-in-last-out pattern during an undo operation. There can be workspace data sets for many different workspaces. A data set for a given workspace can be configured in a database, or as machine readable document linked to the workspace. The workspace can have unlimited or virtually unlimited dimensions. The workspace data includes event data structures identifying objects displayable by a display client in the display area on a display wall, and associates a time and a location in the workspace with the objects identified by the event data structures. Each device 102 displays only a portion of the overall workspace. A display wall has a display area for displaying objects, the display area being mapped to a corresponding area in the workspace that corresponds to a region in the workspace centered on, or otherwise located with, a user location in the workspace. The mapping of the display area to a corresponding area in the workspace is usable by the display client to identify objects in the workspace data within the display area to be rendered on the display, and to identify objects to which to link user touch inputs at positions in the display area on the display.

The server 107 and databases 108 and 109 can constitute a server-side network node, including memory storing a log of events relating to graphical targets having locations in a workspace, entries in the log of events include a location in the workspace of the graphical target of the event, data identifying a type of interaction event, a time of the event, and a target identifier of the graphical target of the event. Participants or users related data can also be stored in the database 108 or in a separate database connected to the server 107. The server can include logic to establish links to a plurality of active client-side network nodes, to receive messages identifying events relating to modification and creation of graphical targets having locations in the workspace, to add events to the log in response to said messages, and to distribute messages relating to events identified in messages received from a particular client-side network node to other active client-side network nodes.

The logic in the server 107 can comprise an application program interface, including a specified set of procedures and parameters, by which to send messages carrying portions of the log to client-side network nodes, and to receive messages from client-side network nodes carrying data identifying events relating to graphical targets having locations in the workspace. Examples of messages received by the server 107 from leader client-side node include play video message, sync video message, load video message, pause video message, seek video message, resume video message, stop video message, unload video message, etc. Examples of messages sent by the server 107 to follower client-side nodes include, follower play video message, follower sync video message, follower load video message, follower pause video message, follower seek video message, follower resume video message, follower stop video message, follower unload video message, etc. The server 107 can also receive messages from follower client-side nodes such as ask video message, join video message, late video message. A follower client-side node can request the server to join synchronized video playback in a collaboration meeting by sending these messages to the server. The server can also receive acknowledgement messages from client-side nodes after sending load video messages to client-side nodes. The server can list the client-side nodes in the follower set of one or more other client-side nodes in response to receipt of the acknowledgement messages within a pre-determined cut-off time interval, e.g., 500 milli seconds. Also, the logic in the server 107 can include an application interface including a process to distribute events received from one client-side network node to other client-side network nodes.

The events compliant with the API can include a first class of event (history event) to be stored in the log and distributed to other client-side network nodes, and a second class of event (ephemeral event) to be distributed to other client-side network nodes but not stored in the log.

The server 107 can store workspace data sets for a plurality of workspaces, and provide the workspace data to the display clients participating in the session. The workspace data is then used by the computer systems 110 with appropriate software 112 including display client software, to determine images to display on the display, and to assign objects for interaction to locations on the display surface. The computer systems 110 are examples of client-side nodes that include display drivers for rendering the viewport and a video/media player for playback of video content. The video player can send and receive messages from the server for synchronized playback of the video. The server 107 can store and maintain a multitude of workspaces, for different collaboration meetings. Each workspace can be associated with a group of users, and configured for access only by authorized users in the group.

In some alternatives, the server 107 can keep track of a "viewport" for each device 102, indicating the portion of the canvas viewable on that device, and can provide to each device 102 data needed to render the viewport.

Application software running on the client device responsible for rendering drawing objects, handling user inputs, and communicating with the server can be based on HTML5 or other markup based procedures, and run in a browser environment. This allows for easy support of many different client operating system environments.

The user interface data stored in database 109 includes various types of objects including graphical constructs, such as image bitmaps, video objects, multi-page documents, scalable vector graphics, and the like. The devices 102 are each in communication with the collaboration server 107 via a network 104. In the example illustration shown in FIG. 1B, the client-side node 102c is a leader and the clients 102d and 102e are follower clients. A video player 315 is displayed on the three client-side nodes in which a video can play in a synchronized manner. It can be seen that the video controls (such as play video button) is enabled on the leader's client-side node and disabled on the followers' client-side nodes. This allows the leader to start playback of the video while the followers view the video playback on their display clients synchronized to the leader's video playback.

The network 104 can include all forms of networking components, such as LANs, WANs, routers, switches, WiFi components, cellular components, wired and optical components, and the internet. In one scenario two or more of the users 101 are located in the same room, and their devices 102 communicate via WiFi with the collaboration server 107. In another scenario two or more of the users 101 are separated from each other by thousands of miles and their devices 102 communicate with the collaboration server 107 via the internet. The walls 102c, 102d, 102e can be multi-touch devices which not only display images, but also can sense user gestures provided by touching the display surfaces with either a stylus or a part of the body such as one or more fingers. In some embodiments, a wall (e.g. 102c) can distinguish between a touch by one or more fingers (or an entire hand, for example), and a touch by the stylus. In an embodiment, the wall senses touch by emitting infrared light and detecting light received; light reflected from a user's finger has a characteristic which the wall distinguishes from ambient received light. The stylus emits its own infrared light in a manner that the wall can distinguish from both ambient light and light reflected from a user's finger. In order to provide a variety of expressive means, the wall 102c is operated in such a way that it maintains "state." That is, it may react to a given input differently depending on (among other things) the sequence of inputs. For example, using a toolbar, a user can select any of a number of available brush styles and colors. Once selected, the wall is in a state in which subsequent strokes by the stylus will draw a line using the selected brush style and color.

In an illustrative embodiment, a display array can have a displayable area totaling on the order of 6 feet in height and 30 feet in width, which is wide enough for multiple users to stand at different parts of the wall and manipulate it simultaneously. Flexibility of expression on the wall may be restricted in a multi-user scenario, however, since the wall does not in this embodiment distinguish between fingers of different users, or styli operated by different users. Thus, if one user places the wall into one desired state, then a second user would be restricted to use that same state because the wall does not have a way to recognize that the second user's input is to be treated differently.

Client Server Architecture

In one embodiment, the technology disclosed to synchronize video playback at multiple client-side nodes is implemented as a client server architecture. In the following sections, we present details of this client server architecture including the messages from applications on client-side nodes to a server and from a server executed on one or more server-side nodes to follower client-side nodes. The system can also include messages from follower client-side nodes to the server. We also present details of the application programming interface (API) calls that are used to communicate between the clients and the server.

Server-Side Process Flowchart

Figure 2:
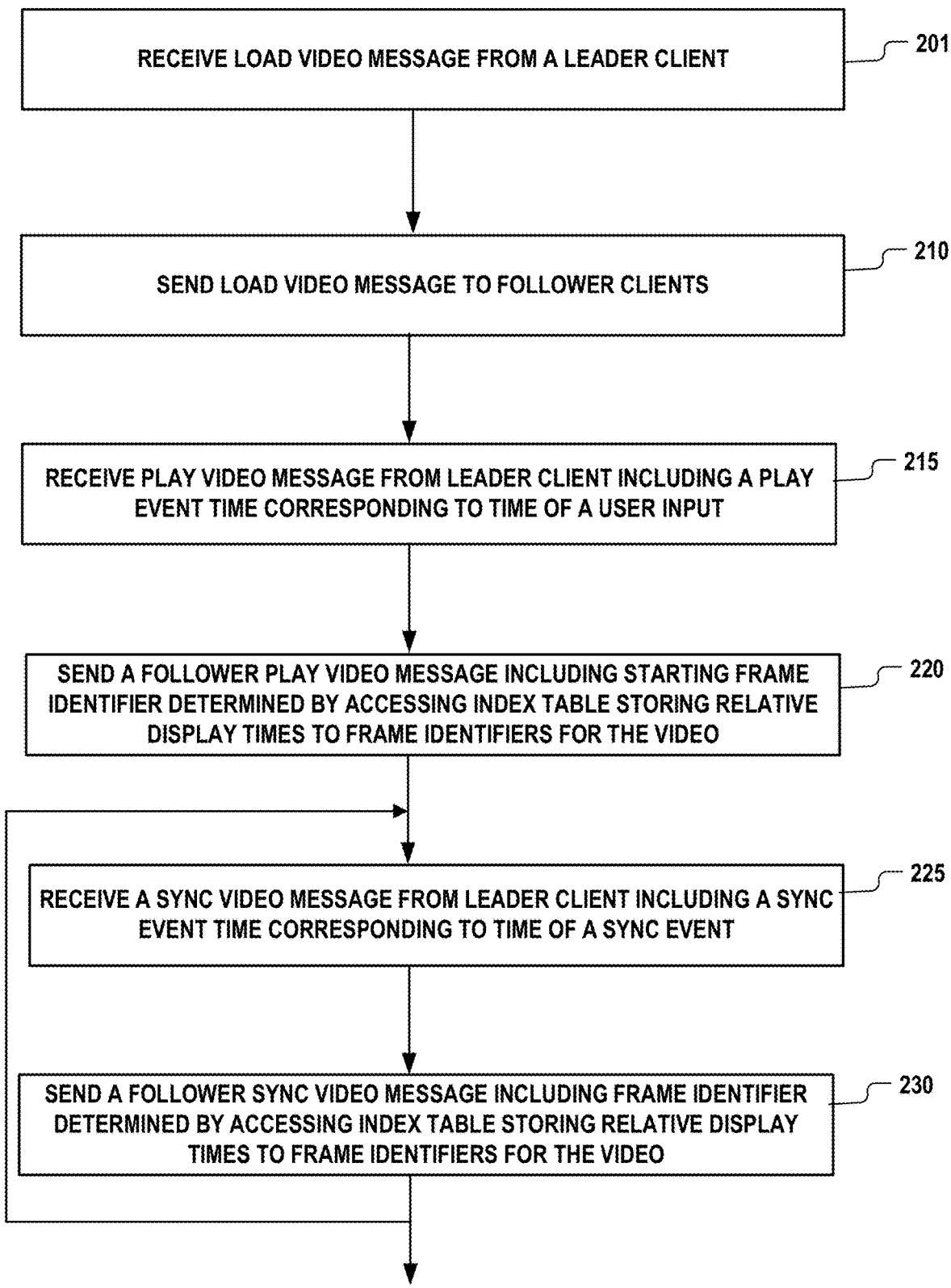
FIG. 2 presents server-side process steps for synchronizing playback of a video at the plurality of client-side nodes in the collaboration system of FIG. 1.

FIG. 2 is a flowchart illustrating logic executed by the collaboration server 107, which is a network node of the digital collaborative workspace system. The logic can be implemented using processors programmed using computer programs stored in memory accessible to the digital collaborative workspace system and executable by the processors, by dedicated logic hardware, including field programmable integrated circuits, and by combinations of dedicated logic hardware and computer programs. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow chart herein shows only steps that are pertinent to an understanding of the invention, and it will be understood that numerous additional steps for accomplishing other functions can be performed before, after and between those shown.

FIG. 2 illustrates logic executed by the server when a user input at the client results in a message to the server. The process starts at a step 201 when the server receives a load video message from a first client-side node (or a leader client-side node) in the plurality of client nodes. The message identifies a load video event including an identifier of a video. The server includes logic to send a follower load video message (step 210) to the follower set of one or more other client-side nodes in the plurality of client-side nodes. The follower load video message includes data identifying the video (or identifying the load video event), in response to which the video can be downloaded at the client-side nodes in the follower set of one or more other client-side nodes.

The server receives a play video message from a first client-side node at a step 215. The play video message identifies a play video event including a play event time corresponding to a time of a user input at the first client-side node to start play of a video at the first client-side node. The server can include logic to map the play event time to a starting frame identifier. The mapping logic can include accessing an index table of relative display times to frame identifiers (or frame numbers). The server can generate (or compose) the index table for the video if it is not already stored in the index table database. The server can send a follower play video message to a follower set of one or more other client-side nodes identifying the play video event (step 220). The follower play video message can include a starting frame identifier. The server includes the logic to determine the starting frame identifier by accessing the index table storing relative display times to frame identifiers for the video. The client-side nodes in the follower set of client-sides nodes can start playing the video at a frame corresponding to the starting frame identifier.

The system includes logic to perform periodic sync of video playback on follower set of one or more other client-side nodes to video playback at the first client-side node. The server receives a sync video message from the first (or leader) client-side node identifying a sync video event at a step 225. The sync video event can include a sync event time corresponding to a time of a sync event at the first client-side node. In one example, the server can receive a sync message every 250 milli seconds from the first client-side node. The system can use other time intervals greater than 250 milli seconds or less than 250 milli seconds to sync the video playback of follower client-side nodes to the leader client-side node. The server uses the index table to map the sync event time in the sync video event to a sync frame identifier.

At a step 230, the server sends a follower sync video message to the follower set of one or more other client-side nodes identifying the sync video event and including the syn frame identifier. In response to this follower sync video message the one or more client-side nodes in the follower set can synchronize playing the video at a frame corresponding to the sync frame identifier. The process steps 225 and 230 are repeated at regular intervals such as every 250 milli seconds.

Example of Index Table

FIG. 3 presents two examples of index table of video frames. The first table 301 includes mapping of frame identifiers (or frame numbers) of 15 frames in a video to their respective display time stamps. The second example table, labeled as 311 includes mapping of 16 frames of a video to their respective display time stamps. The time is listed in milli seconds. The display time stamps indicate the relative display times to frame numbers (or frame identifiers) for the video. In one example, the display time for a frame can indicate the time at which the frame is displayed in the video from a starting time at the beginning of the video or the display time of the first frame. The technology disclosed can use third party tools such as FFProbe, MP4Box to parse the video files and generate (or compose) the index table. The display time stamps can also be generated by hardware clocks such as in video recording cameras. For video recorded at a rate of 30 frames per second, the display times of frames are at an increment 33 milli seconds. However, not all videos are recorded on a same frame rate, examples of commonly used frame rates include 24 frames per second (fps), 30 fps, 60 fps, etc. Further, we can have video footage files that can include clips with different frame rates. Therefore, it is difficult to use the frame rate of a video to directly compute the display time stamps.

The presence of different types of frames in a video make it more difficult when determining display rates of frames. For example, a video can include key frames (also referred to as I-frames) and delta frames (referred to as P-frames and B-frames). The P-frames can use data from previous frames and B-frames can use both previous and next frames for data reference. These types of frames can provide high data compression for efficient storage of video files. Consider the frames in a video are displayed as I B B P. We need to know the information in frame P before we can display either of the frames B. Because of this, the frames may be stored as I P B B. This is why we have a separate decoding time stamp (DTS) and presentation time stamp (PTS) for each frame. The decoding time stamp tells us when we need to decode a frame and presentation time stamp tells us when we need to display a frame. In this case, our stream of frame may be arranged as following:

| PTS: | 1 | 4 | 2 | 3 |
| DTS: | 1 | 2 | 3 | 4 |
| Stream: | I | P | B | B |

The technology disclosed uses display times of frames in a video to compose the index table. Presentation time stamps are an example of display times. The index table can have display times that may not be uniformly distributed as the time stamps are extracted from frame metadata, therefore the display times precisely indicate the starting times at which the frames are displayed. For example, if calculated using the frame rate, the display times of 30 frames per second video are 33 milli seconds apart. However, the technology disclosed determines the actual display time of frames using the frame metadata, therefore, the display times for consecutive frames in a 30 frames per second video can vary between 1 milli second to 33 milli seconds. The technology disclosed includes a preprocessing step to generate the actual display times of frames using video parser tool such as FFProbe, or MP4Box, etc. The index table can be stored in a database 108 on a local storage device attached to the server or a cloud-based storage. The server can download the index table and store it in memory during the collaboration session in which the video is being reviewed by participants. Note that for a given video, the index table can be generated once, and reused for subsequent collaboration sessions.

Figure 4:
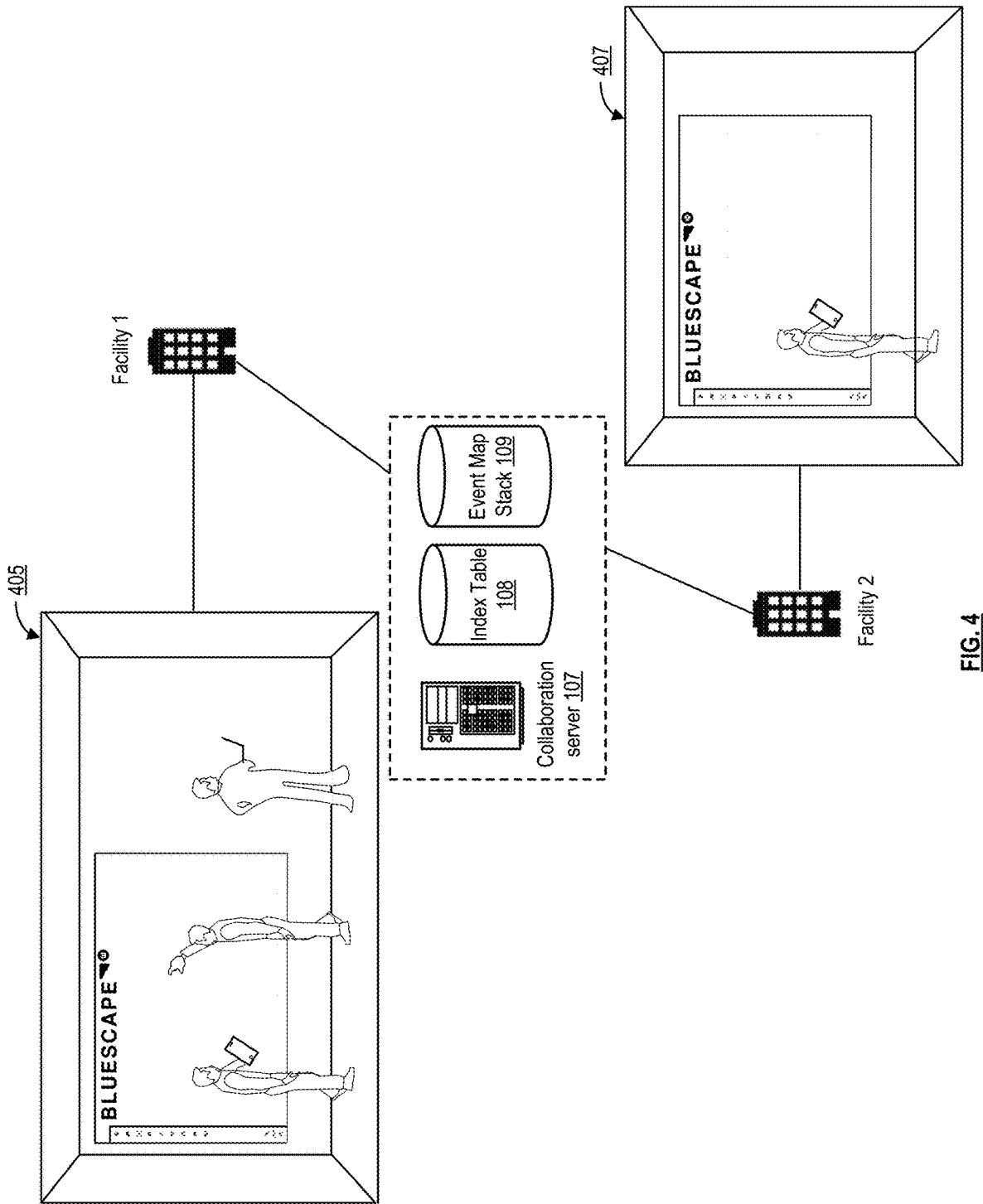
FIG. 4 illustrates a collaboration system including a plurality of geographically distributed display walls, and other computing devices to which collaboration data including videos can be delivered for synchronized playback.

We now describe an example in which technology disclosed can be deployed as a distributed collaboration system. FIG. 4 illustrates an example of a distributed collaboration system. The system can include a shared collaboration server 107 which can be linked to a number of facilities (e.g. facility 1 and facility 2) which are geographically distributed, and at which display clients are located. For example, Facility 1 may be located in New York City, while Facility 2 may be located in Los Angeles. There may be many other physical locations at which display clients usable in a collaboration system are located. For example, Facility 1 can include one or more meeting rooms and offices. It can be seen that three users are attending a collaboration meeting in room 205. The workspace can be downloaded on the digital display wall in the meeting room and also on tablet and laptop computers of the users attending the meeting. For illustration purposes, we have shown one room 205 in Facility 1. The room 205 in Facility 1 can include one or more digital display walls. It can also include large-format display that is implemented using a plurality of displays. The other meeting rooms in Facility 1 can include digital display walls or other computing device such as laptop or desktop computers. The users can also join collaboration meeting from their private offices or other rooms in which the personal computer or laptop can be utilized as the display client for a session interacting in a chosen workspace.

Facility 2 in this illustration is like Facility 1. Facility 2 can also include one or more meeting rooms and offices. For illustration purposes we have shown one room 207 in Facility 2 the includes a digital display wall. Facility 2 can also include other meeting rooms and offices. The users can join collaboration meeting from other meeting rooms in Facility 2 or private offices or other rooms in which the personal computer, laptop, tablet mobile computing devices, or mobile phone can be utilized as the display client for a session. One user is seen attending the meeting in the room 207. The workspace can be downloaded on the digital display wall in the room and the tablet device of the user.

Figure 5:
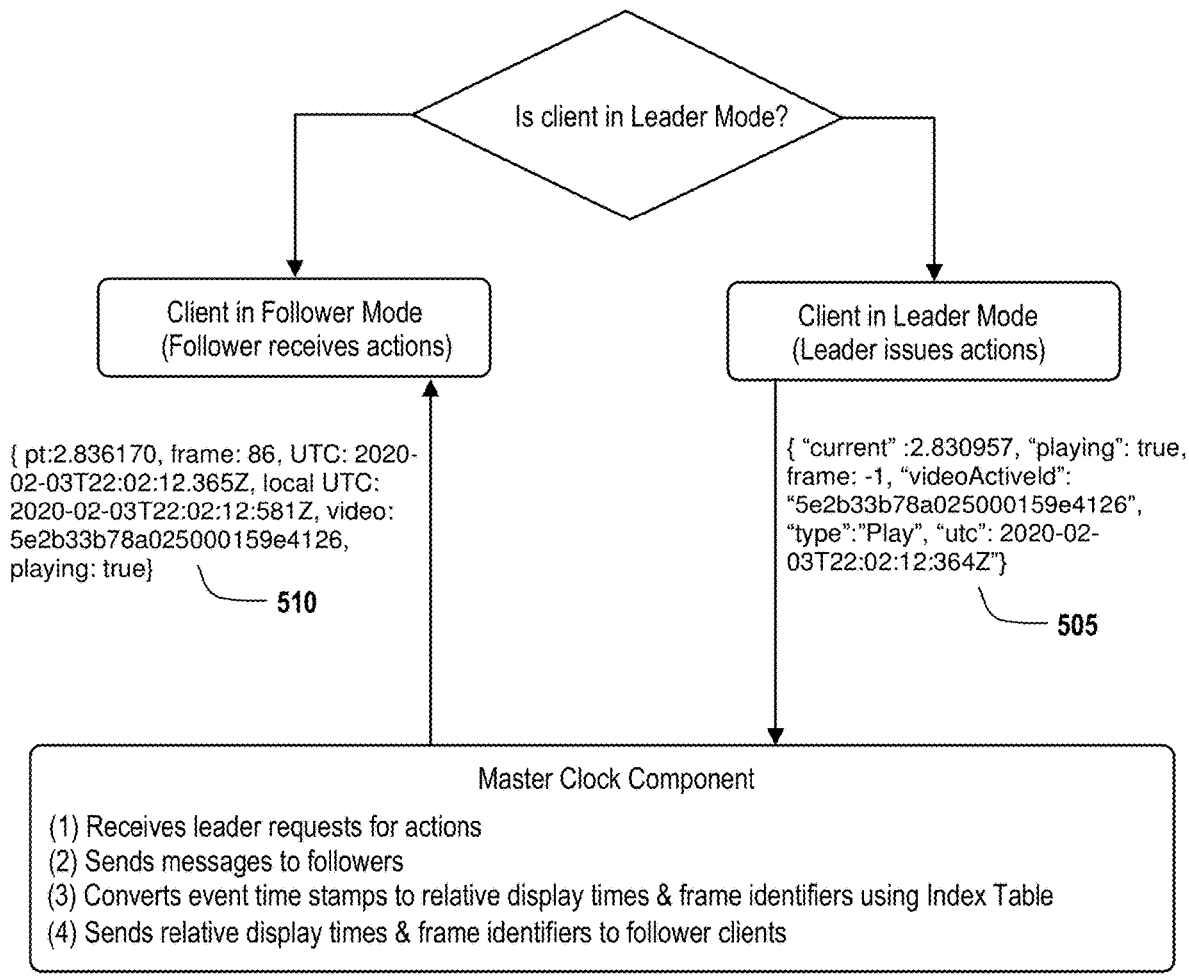
FIG. 5 is a high-level process diagram for synchronized playback of a video at the plurality of client-side nodes.

FIG. 5 is a high-level process diagram illustrating two modes of operations of client-side nodes (leader mode and follower mode) and their interactions with master clock (MC) component included in the server or accessible by the server. If the client-side node is in a leader mode, it can send messages (or issue actions) to MC component. An example message 505 is shown that includes the "current" value of the display time "2.830957" seconds as determined by the position of the scrubber on the video player, the "playing" parameter is set as "true" indicating that the video is currently playing on the video player on leader client-side node, the "frame" value is set as "−1" which can indicate that the follower client-side nodes can start playing video from the beginning. The message can include other parameters such as video player identifier, video identifier, the type of event, e.g., "play", "pause", "resume", "sync", "stop", or "load" etc. The message can also include a universal time stamp value (UTC) indicating a time when the event is generated at the client-side node. If the client-side node is in a follower mode, the server sends messages or actions to follower client-side nodes. An example message from server to follower client-side nodes is shown labeled as 510. The message includes a presentation time stamp or "pt" parameter which is the display time of the frame determined by the server by accessing the index table. The "frame" identifier value is also included in the message to follower clients. In one embodiment, the follower client-side nodes can use the frame identifier to synchronize the playback of the video to playback of the video at the leader client-side node. In another embodiment, the follower client-side nodes can use the display time (such as presentation time stamp) to synchronize the playback of video to leader client-side node. The system can use a variety of video players to display the video. For example, the system can use a custom video player built using video.js™ platform (available at videojs. com) that can receive video messages from the server including the display time to synchronize the video playback at client-side nodes. The system can also use video/media players that can receive frame identifiers from the server and synchronize playback of the video at the client-side nodes using the frame identifiers from the leader client.

FIG. 5 presents an example list of four high level operations performed by the MC component. The MC component can receive video messages from leader client-side node. The MC component can send follower video messages to the follower client-side nodes. The MC component includes logic to convert event time stamps to relative display times and frame identifiers using the index table. Finally, the MC component can send relative display times and frame identifiers to follower clients. The technology disclosed includes API calls for load, play, stop, pause, resume, seek, and unload video events from leader client-side node to server. The technology disclosed includes API calls for ask, late, and join events from the follower client-side nodes to server. We present further details of the API calls below.

Leader Client Process Flow

Figure 6A:
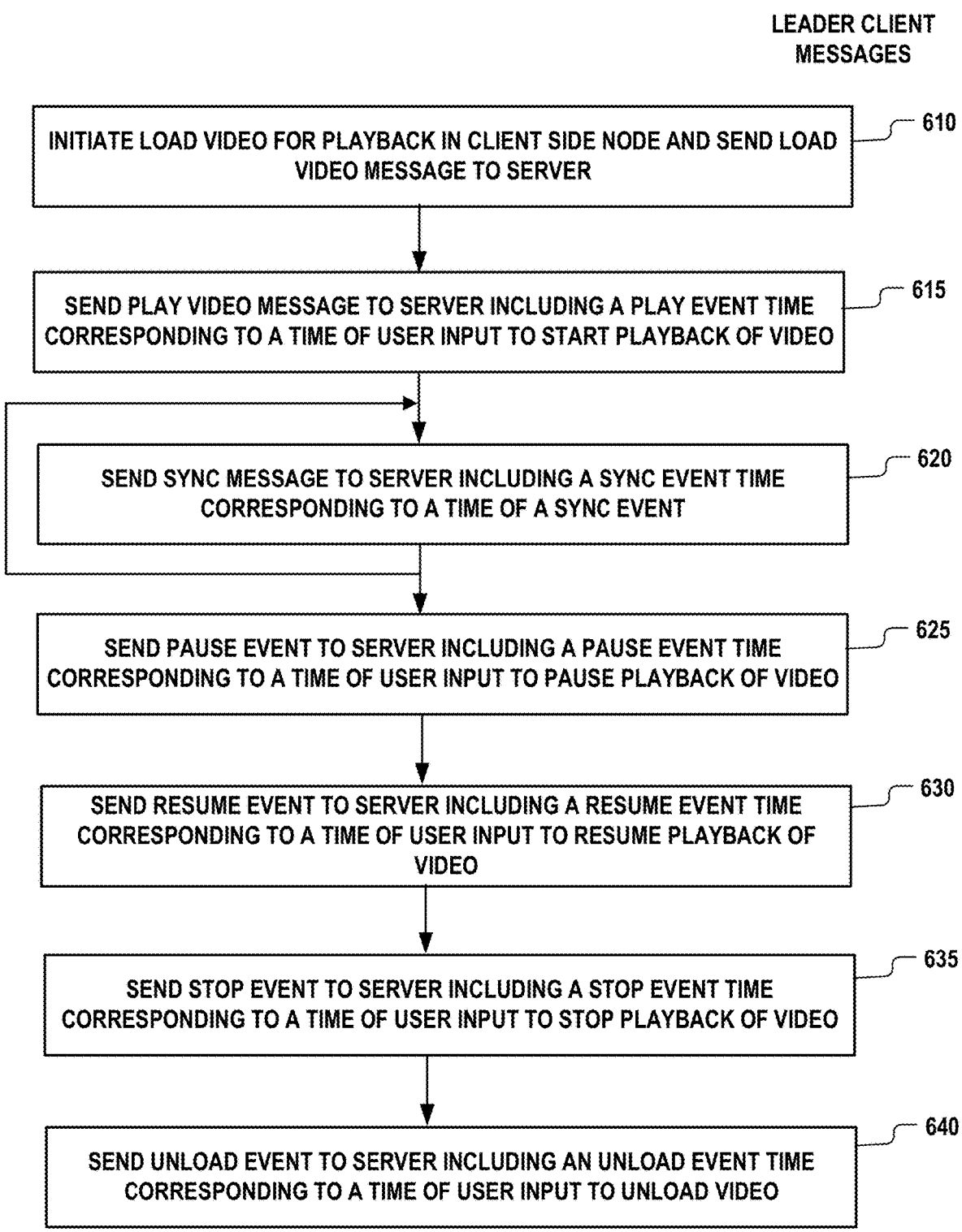
FIG. 6A presents client-side process steps for a leader client for synchronized playback of a video at the plurality of client-side nodes.

FIG. 6A is a flowchart illustrating process steps for sending video messages from first of leader client-side node to server node. The leader client-side node (or the first client-side node) sends a load video message identifying a load video event including an identifier of a video (step 610). The server sends a follower load video message to the follower set of client-side nodes in the plurality of client-side nodes in response to the load video message from leader client-side node. The follower load video message can include data identifying the video or it can include data identifying the load video event. In response to this message, the video can be downloaded at the follower client-side nodes. The leader client-side node sends a play video message to the server at a step 615. The play video message can include a play event time corresponding to a time of user input to start playback of the video. The leader client-side node can periodically send sync video message to server at regular intervals, e.g., every 250 milli seconds (step 620). Also, sync video messages can be sent to the server at times indicated by a user input signal or in response to other actions in the clients. The sync video message can include a sync event time corresponding to a time of a sync event.

The first or leader client-side node can send a pause video message to the server-side node. The pause video message can include a pause event time corresponding to a time of a user input at the leader client-side node to pause play of the video at the first or the leader client-side node (step 625). The server can include logic to map the pause event time to a pause frame identifier using the index table. The server sends a follower pause video message to the follower set of other one or more client-side nodes identifying the pause video event and including the pause frame identifier. In response to this message the one or more other client-side nodes in the follower set can synchronize pausing the video at a frame corresponding to the pause frame identifier.

The first or leader client-side node can send a resume video message to the server-side node. The resume video message can include a resume event time corresponding to a time of a user input at the leader client-side node to resume playback of the video at the first or leader client-side node (step 630). The server can include logic to map the resume event time to a resume frame identifier using the index table. The server sends a follower resume video message to the follower set of other one or more client-side nodes identifying the resume video event and including the resume frame identifier. In response to this message the one or more other client-side nodes in the follower set can synchronize resuming play of the video at a frame corresponding to the resume frame identifier.

The first or leader client-side node can send a stop video message to the server identifying a stop video event corresponding to a time of a user input at the first or leader client-side node to stop play of the video at the first client-side node (step 635). The server can include logic to map the stop event time to a stop frame identifier using the index table. The server sends a follower stop video message to the follower set of one or more other client-side nodes identifying the stop video event. The stop video message can include the stop frame identifier. In response to this message, the follower set of one or more other client-side nodes can synchronize stopping play of the video at a frame corresponding to the stop frame identifier.

The first or leader client-side node can send an unload video message to the server identifying an unload video event corresponding to a time of a user input at the first or leader client-side not to unload (or remove) the video at the first client-side node (step 640). The unload video message can include an identifier of the video to unload. The server can send a follower unload video message to the follower set of one or more other client-side nodes identifying the unload video event. The follower unload video event can include the video identifier. In response to this message the follower set of one or more other client-side nodes can synchronize unloading (or removing) the video from their respective clients.

The first or leader client-side nodes can send other messages to server node. For example, the first or leader client-side node can send a seek video message to the server identifying a seek video event including a seek event time corresponding to a time of a user input at the first client-side node to seek the video at the first client-side node. The server can include the logic to map the seek event time to seek frame identifier. The server can then send a follower seek video message to the following set of one or more other client-side nodes identifying the seek video event including the seek frame identifier. In response to this message, the one or more client-side nodes in the follower set can synchronize seeking the video at a frame corresponding to the seek frame identifier.

Figure 6B:
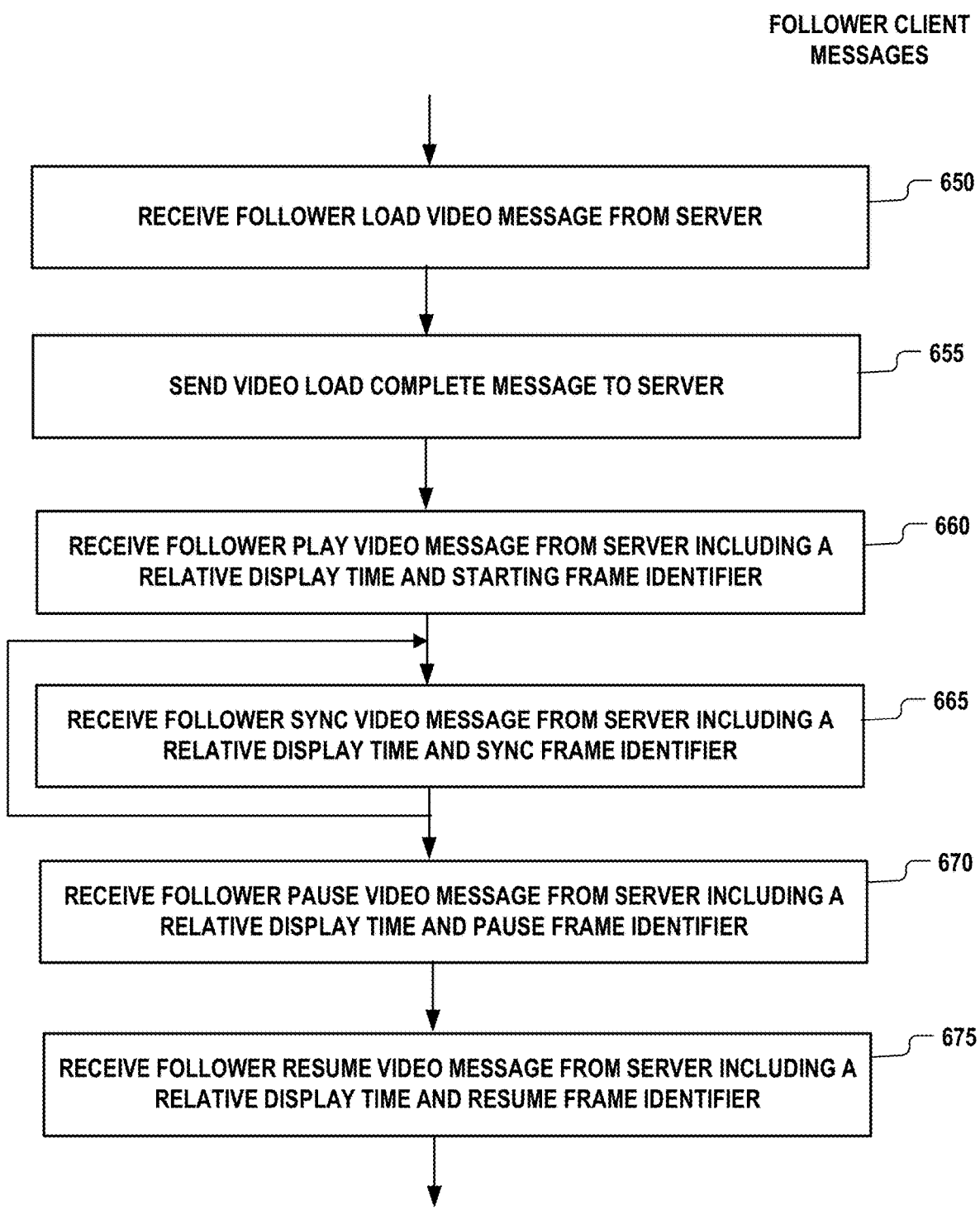
FIG. 6B presents client-side process steps for a follower client for synchronized playback of a video at the plurality of client-side nodes.

FIG. 6B presents flowchart of process steps executed on follower client-side nodes. At a step 650 the follower set of one or more other client-side nodes receive load video message from server. The follower load video message can include data identifying the video or identifying the load video event. In response to receiving follower load video message, the follower set of one or more other client-side nodes can download the video. The client-side nodes send an acknowledgement message to the server-side node after completing the video download. In one embodiment, the client-side nodes can send an acknowledgement message after downloading a portion of the video. The client-side nodes that send the acknowledgement message to server-side node within a pre-determined time period can be included in the follower set of client-side nodes for synchronized video playback. For example, the server can include the clients from which it receives the acknowledgement within 500 milli seconds of sending the follower load video message in the follower set. The client-side nodes from which the server does not receive acknowledgement message can play the video but their video playback may not be synchronized to the playback of the video at the leader client-side node.

The follower set of client-side nodes receive a follower play video message from server that includes a starting frame identifier (step 660). The message can also include relative display time of the starting frame identifier. The client-side nodes in the follower set can start playing the video at a frame corresponding to the starting frame identifier. The client-side nodes in the follower set can receive periodic follower sync video messages from the server to sync their video playback to the video playback at the leader client-side node (step 665). The server can send the periodic sync messages after every 250 milli seconds. Other time durations greater than 250 milli seconds or less than 250 milli seconds can be used to send the follower sync messages. The follower sync message can include a sync frame identifier and relative display time. The client-side nodes in the follower set of client-side nodes can synchronize playing the video at a frame corresponding to the sync frame identifier. In another embodiment, the client-side nodes in the follower set of client-side nodes can synchronize playing the video using the relative display time of the frame received from the server.

The client-side nodes in the follower set can receive follower pause video message from server-side node including a pause frame identifier and relative display time for the pause frame identifier (step 670). The follower set of client-side nodes can synchronize pausing the video at a frame corresponding to the pause frame identifier. The follower set of client-side nodes can also use the relative display time to synchronize pausing the video at a frame corresponding to the paused frame at the leader client-side node.

The client-side nodes in the follower set can receive follower resume video message from server-side node including a resume frame identifier and relative display time for the resume frame identifier (step 675). The follower set of client-side nodes can synchronize resuming play of the video at a frame corresponding to the resume frame identifier. The follower set of client-side nodes can also use the relative display time to synchronize resuming play of the video at a frame corresponding to the resumed frame at the leader client-side node.

The client-side nodes can also send messages to the server to join synchronized playback of a video in a collaboration session. Examples of such messages include "ask video" message, "late video" message, and "join video" message. The client-side node can send an ask video message to the server when the video playback at the client-side node is not synchronized to the video playback at the leader client-side node. In one embodiment, the follower client-side sending the ask video message may not have joined the collaboration meeting. The ask video message can include the workspace identifier, a message type, a time stamp indicating the time of request. The client-side node can also send a "late video" message to the server for synchronized playback of a video at the client-side node. This message may be sent from the follower client-side node in response to a late video message from the server for synchronized video playback. The late video message can include a message type parameter, a relative display time of the frame displayed in the video player at the client, a frame identifier, a video player identifier and a video identifier. A client-side node which has downloaded a video and is ready to play the video synchronized to the leader client can send a "join video" message to the server. The join video message can include message type parameter, a relative display time of the frame displayed in the video player at the client, a frame identifier, a video player identifier and a video identifier. In response to the above messages, the server can send messages to the requesting client with information to synchronize its video playback to the video playback at the leader client-side node.

Leader, Follower and Server Sequence Diagram

Figure 7:
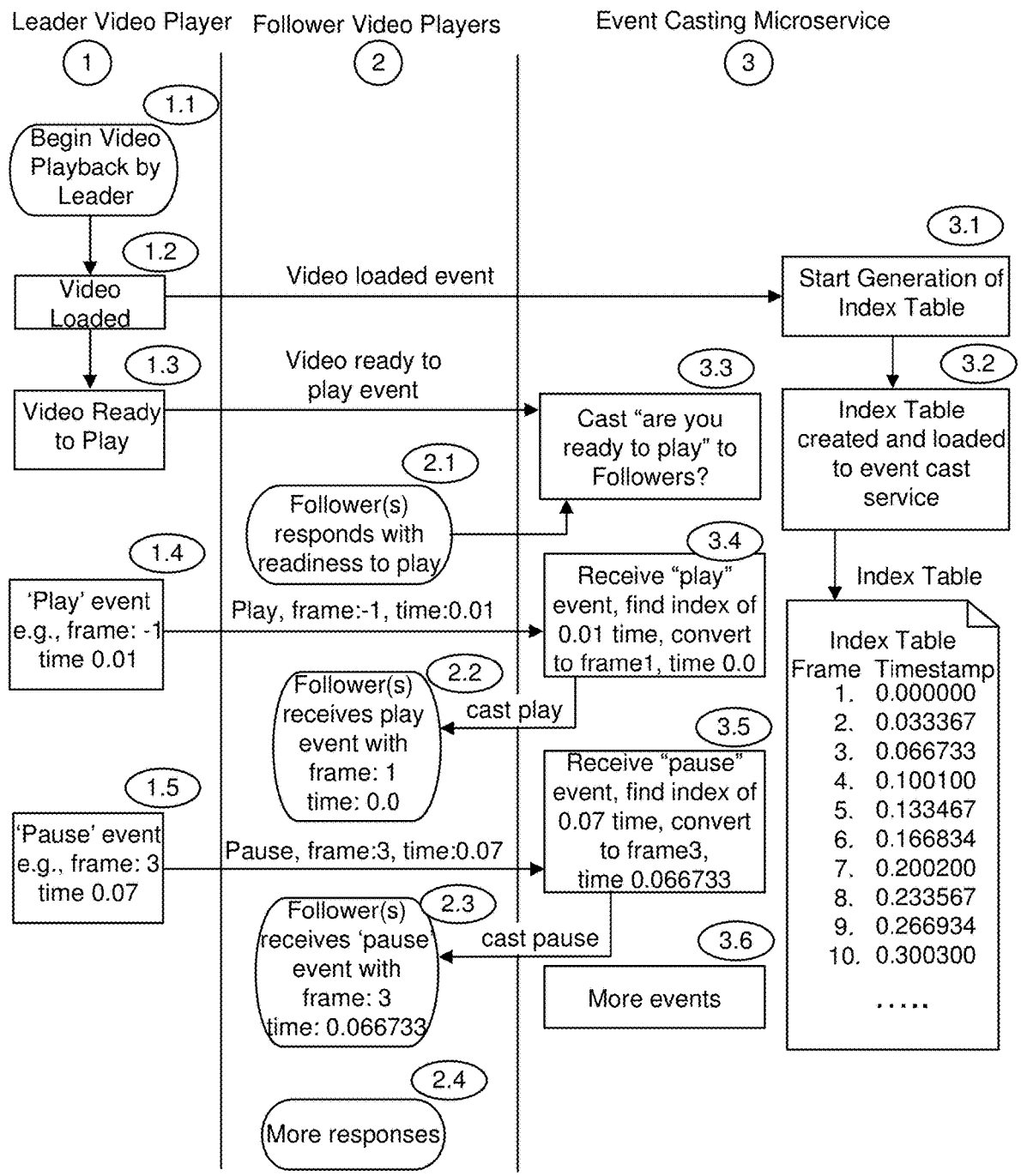
FIG. 7 presents a sequence diagram illustrating messages between three actors including a leader client, a follower client and an event casting microservice running at the server for synchronized playback of a video.

FIG. 7 presents a sequence diagram illustrating messages between a leader client-side node (labeled "1"), a follower client-side node (labeled "2") and the server-side node implementing the event casting microservice (labeled "3"). The event casting microservice can be implemented as part of the master clock (MC) component at the server. The process steps (represented as messages) are labeled as 1.1, 1.2, up to 3.6. A process step can include sending an event using messages from one actor to another via an API. We present the interaction between the actors via the messages. The interaction is organized in different steps including load video, access index table, play video, and pause video. We also present examples of API calls.

Step 1: Load Video

The process starts at a step 1.1 in which the leader client-side node initiates video playback. At the beginning of the video collaboration session, video players on client-side nodes participating in the collaboration session can send their current time stamps to master clock (MC) component in response to a time stamp request message from the MC component. The MC component can calculate reference time offset of video players using these initial time stamps. The reference time offset can be used by the MC component to avoid time drift during the video playback. The second step in the process is to load video (1.2). The 'videoLoaded' event can be generated at the leader client-side node after the video upload to server is complete and signals end of the video upload process step. An example of this videoLoaded event API call is presented below.

videoLoaded(video) {{action: 'loaded' pt: 0, frame: −1 utc: 2020-02-03T21:02:38.180Z, video: 5e2b33b78-a025000159e4126, asset: 5e18ce710ebdbd0016c-1ca2b, 'playing': false}}

The videoLoaded message can include a frame number, a universal time value, a video player identifier, a video asset identifier and a flag labeled as 'playing' indicating whether the video is playing at the leader client. The "video" parameter is identification of the video player in which video will be played. The "asset" parameter identifies the video file to be played.

The 'videoLoaded' message is sent to the MC component from the video player of leader client-side node. Upon receiving this message, the MC component sends a message to follower set of one or more other client-side nodes to download the video identified in the message for synchronized playback. The follower set of client-side nodes send acknowledgement message back to the MC component after downloading the video within a predefined time duration (e.g., 500 milli seconds). The follower client-side nodes which do not respond to MC component within the predefined time limit can be excluded from synchronized playback collaboration session. The video can play at the client-side nodes, but it may not be synchronized to leader's video playback. In one embodiment, the audio is muted on the video players of follower client-side nodes which play the video in synchronous mode. This is to avoid echo during the collaboration meeting. The followers can hear voice of the participant at the leader client-side node during the playback of the video as the voice of the participant is transmitted on a separate channel. The technology disclosed can provide a button on the user interface display of the follower client-side nodes to turn on the audio in video players. In another embodiment, the audio is not turned off by default at the follower client-side nodes. The system presents user interface messages to participants on their respective display clients indicating that their video playback sound is mute.

As mentioned above, initial times tamps (indicating current time) from video players from clients can be sent to MC component, in response to a time stamp request message from the MC component. These initial time stamps can be used by MC component to determine the time offsets for participants in a collaboration session and determine time drifts of video players during video playback. The system can also calculate network latencies between the leader client-side node and the follower client-side nodes using this information. In one implementation, the system can use an average or default value of network latency such as 100 milli second. A cellular network can result in a higher value of latency. For example, for a 30 frame per second video, this latency values means approximately 3 frames difference between the leader client-side node and follower client-side node. At the beginning, when the MC component sends out the "video play" event to all video players, if the network latency is same, all the video players can start video playback at the same time and video will start playing from the beginning. However, the technology disclosed can adjust the "video play" event time in a way to take network latency differences into account. In one embodiment, the system can display a message on the follower's display indicating that she has missed some frames, if the follower's network is very slow and initial download exceeds time threshold (e.g. 500 ms). In another embodiment, the system can start the video playback at the leader's display at the same time at which the follower's video is played, i.e., introduce a small delay in the beginning so that videos on all participants (leader and followers) start in synchronous mode.

Step 2: Access Pre-Generated Index Table

The MC component uses pre-generated index table (also referred to as times tamp table) at a step 3.1, upon receiving the videoLoaded API message from leader client-side node. The MC component can store the index table in a database. In addition, the index table can be stored in memory of the server-side node for use in synchronization of the video playback (step 3.2). The FIG. 7 also shows as example index table that lists starting timestamps of ten frames of the video file. Note the index table is generated once for a video when it is played for the first time. The same index table can be reused for subsequent playbacks of the video.

Step 3: Play Video

The MC component sends follower play video message to follower set of client-side nodes and waits for a response indicating if they are ready to play the video (step 3.3). The video players on leader and followers' clients side nodes respond to the MC component indicating that they are ready for playback of the video (as shown in steps 1.3 and 2.1). The system can include an initial cut-off time such as up to 500 milli seconds in which the clients side nodes download the video on their respective clients. Any clients that have not downloaded the video on their clients before the end of the cut-off time may be excluded from the synchronized video playback. Note that the video download can include an initial portion of the video which is buffered at the client for playback. Due to network congestion, if the leader client-side node's video download is not ready, within the cutoff threshold, system includes logic to select one of the follower client-side nodes as a new leader. The system can send messages to leader and followers regarding change of the follower client-side node to become the new leader. The system can also present an option to follower client-side nodes where participants can provide input to select if they like to become the leader.

The leader client-side node can start playing the video content by calling the playVideo event API as shown below (step 1.4). The video will start playing from the time stamp of the frame passed by the leader. The video player on leader's display client can send current presentation timestamp (pt) for the video, the frame number and UTC timestamp to the MC component. If the frame number is '−1' in the playVideo message, it means, start playing the video from the beginning. An example playVideo message is shown below.

playVideo(video) {{action: 'play' pt: 0.066733, frame: 2 utc: 2020-02-03T21:02:35.671Z, video: 5e2b33b78a025000159e4126, 'playing': true}}

The above playVideo message is received at the MC component (step 3.4). The logic in the MC component finds the frame number in the index table that has a display time matching the value of the presentation time stamp (pt) in the message. If a frame in the index table has a display time matching the presentation time stamp, then the MC component passes this frame number to followers for playback. In many cases, the value of the presentation time stamp does not match the display time stamp of a frame in the index table. In such cases, the value of presentation time stamp falls somewhere between the display times of two frames in the index table. The MC component can select the frame with an earlier display time and pass this frame number (or frame identifier) to the follower client-side nodes (step 2.2) for playback. The reason to select the frame with earlier display time than the presentation time stamp is to avoid any bumps or choppiness in the playback of the video at the follower client-side nodes.

Step 4: Pause Video

When the participant at the leader client-side node pauses video playback, a pause message is sent by the video player in the client to MC component (step 1.5). The system can generate a pause video event and store it in the spatial event map. The MC component can repeat the process steps described above to find a frame from the index table using the presentation time stamp in the received pause message (step 3.5). The follower client-side nodes receive a pause message (step 2.3) from the MC component including the frame number (or identifier) to pause at. The followers' video will be paused at the same frame at which the leader's video is paused. Thus, the technology disclosed enables synchronous video content collaboration by providing the same frame at the client of each participant when the leader wants to discuss content of that frame. The API call for pause video event is presented below.

pauseVideo(video) {{action: 'pause' pt: 1.301301, frame: 39 utc: 2020-02-03T21:02:38.180Z, video: 5e2b33b78a025000159e4126, 'playing': false}}

Additional API Messages from Leader Client

The technology disclosed can generate additional events such as videoUnloaded, stopVideo, resumeVideo, and seekVideo to synchronize video playback at the followers' clients to video playback at the leader's client. We provide examples of API calls below:

'videoUnloaded' event is used for housekeeping purposes. A message can be sent from MC component to all participants to remove video from their clients.

videoUnloaded(video) {{action: 'unload', utc: 2020-02-03T21:02:38.180Z, video: 5e2b33b78a025000159-e412611

'stopVideo' event is generated when video playback is stopped.

stopVideo(video) {{action: 'stop' pt: 30.0, frame: 900 utc: 2020-02-03T21:02:35.671Z, video: 5e2b33b78a-025000159e4126, 'playing': false}}

'resumeVideo' event is generated when video playback is resumed by the leader from a particular frame.

resumeVideo(video) {action: 'resume' pt: 1.301301, frame: 39 utc: 2020-02-03T21:02:38.180Z, video: 5e2b33b78a025000159e4126, 'playing': true}}

'seekVideo' event is generated when the participant at the leader client-side node moves the video playback to a particular frame using the scrubber on the video player. This can also be referred to as moving the video playhead to a particular position. Providing the leader to start playback of video at a particular frame can be a useful feature to move for discussion and collaboration purposes. The technology disclosed provides a user interface widget that allows the leader to move to a particular frame in the video.

seekVideo(video) {action: 'seek' pt: 1.301301, frame: 39 utc: 2020-02-03T21:02:38.180Z, video: 5e2b33b7-8a025000159e4126, 'playing': true}}

API Messages from Follower Client

The following three events are generated by followers' client-side nodes.

'askVideo' event is generated when a follower's client sends a request to MC component for syncing video playing on the follower's client.

askVideo( ) {{type: 'ask', ws: 'xqIAt4CiZy_znN_Woelx', utc: 1582653226902}}

'lateVideo' event is generated when a "late" follower client receives "late" message from MC component to join a collaboration session with synchronized video playback. A late follower can be a participant of a collaboration session who joins the collaboration session after the collaboration has started.

lateVideo( ) {{type: 'late', pt: 1.301301, frame: 39, utc: 1582653226902, video: '5e2b33b78a0250001-59e4126', asset: '5e18ce710ebdbd0016c1ca2b', on: true}}

'joinVideo' event is generated when a "late" follower sends a request to MC component to join the synchronized video playback, the message includes the video identifier indicating that the follower has downloaded the video and is ready to play the video in synchronized manner with the leader. The message can also include an identifier of the video player on the client for playback of the video.

joinVideo( ) {{type: 'join',pt: 1.301301, frame: 39, utc: 1582653226902, video: '5e2b33b78a025000159-e4126', asset: '5e18ce710ebdbd0016c1ca2b', on: true}}

Figure 8:
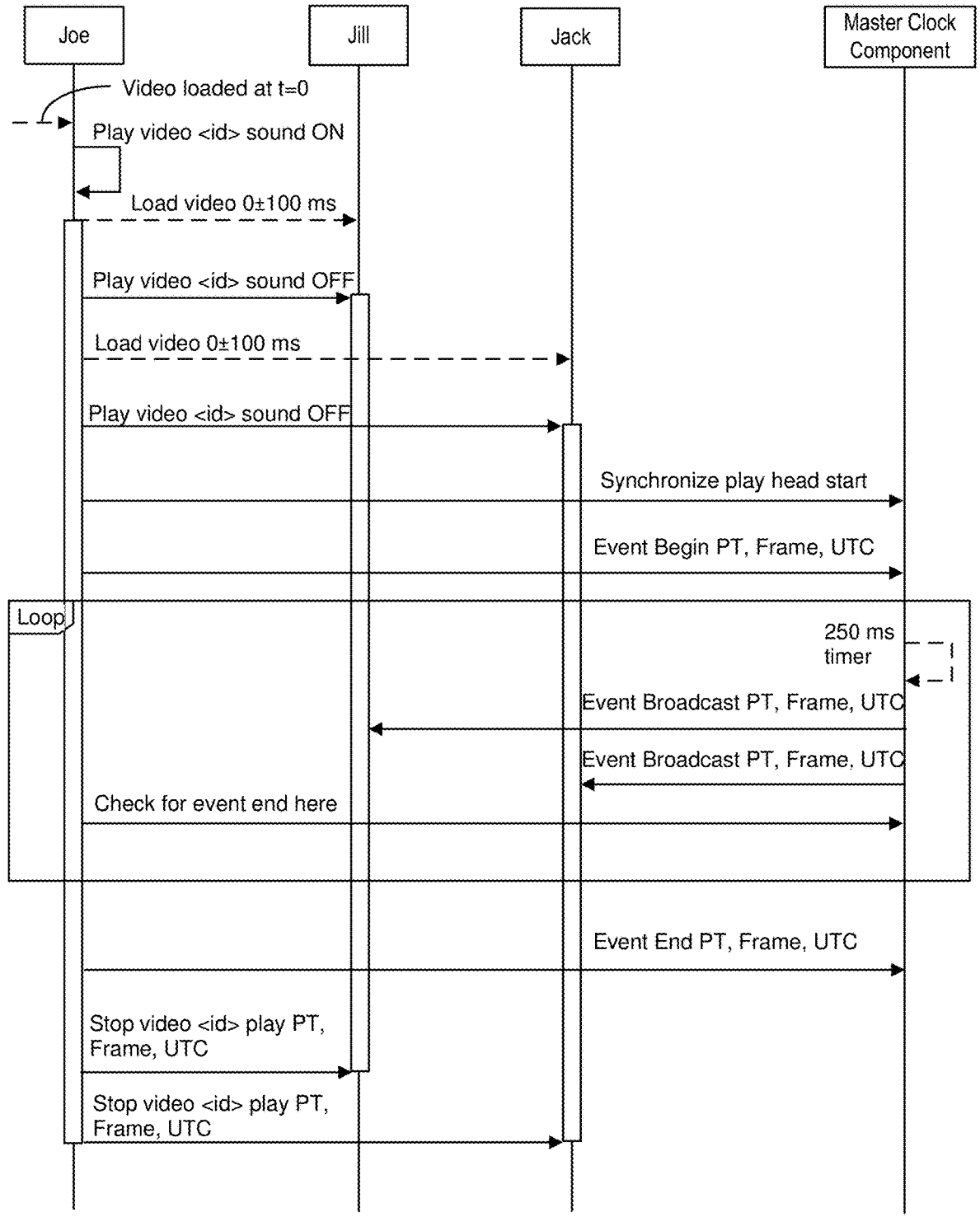
FIG. 8 presents a sequence diagram illustrating messages between a leader client, two follower clients and a component implementing server-side logic to implement synchronized playback of a video.

FIG. 8 presents a sequence diagram for synchronized video content playback. The sequence diagram includes a leader (labeled as Joe), two followers (labeled as Jill and Jack), and the master clock (MC) component. The process starts when video is loaded at time t=0 at the leader client-side node (labeled Joe). The video can start playing in the video player at the leader client-side node. The play video message includes the "id" of the video and the sound is "ON" by default when the video starts playing. The follower client-side nodes labeled as Jill and Jack receive load video messages. Due to network latencies, the follower client-side nodes can receive the message with up to 100 milli second delay. The follower client-side nodes receive play video messages followed by load video messages. Note that in this example, the load and play video messages are shown as sent from the leader (Joe) to the followers (Jill and Jack) directly without going to the server. The system can include the logic in which the leader client-side node can send the video load and video play messages directly to the follower client-side nodes. The leader client-side node sends a synchronize play head start message to master clock (MC) component which executes on the server-side node. Following this, the leader client-side node sends an event begin message to MC component including the presentation time stamp (PT), frame identifier and a universal time stamp indicating the time of the event at the leader client-side node. Note that the presentation time stamp can be an approximate display time calculated by the video player based on the position of the scrubber. As described above, this time may not accurately identify a frame. The technology disclosed uses an index table to map this time to relative display time of the frame identifiers in the video. The frame identified by the relative display time is then sent to the follower client-side nodes to synchronize their video playback.

The messages inside the loop box are repeated periodically such as every 250 milli seconds which is shown as a 250 milli second timer message to MC component. It is understood that values for the timer less than or greater than 250 milli seconds can be used. The MC component broadcasts sync events to follower client-side nodes including presentation time stamp, frame identifier and the universal time of the event broadcast. Note that the presentation time stamp in the broadcast events are the relative display times obtained by accessing the index table. Finally, the leader client-side node sends an event end message to MC component. Following this, the follower client-side nodes receive stop video messages from the leader client-side node. As mentioned above, the system can include the logic to send the stop event messages from the MC component to follower clients or directly from the leader client to the follower clients as shown in sequence diagram.

Figure 9:
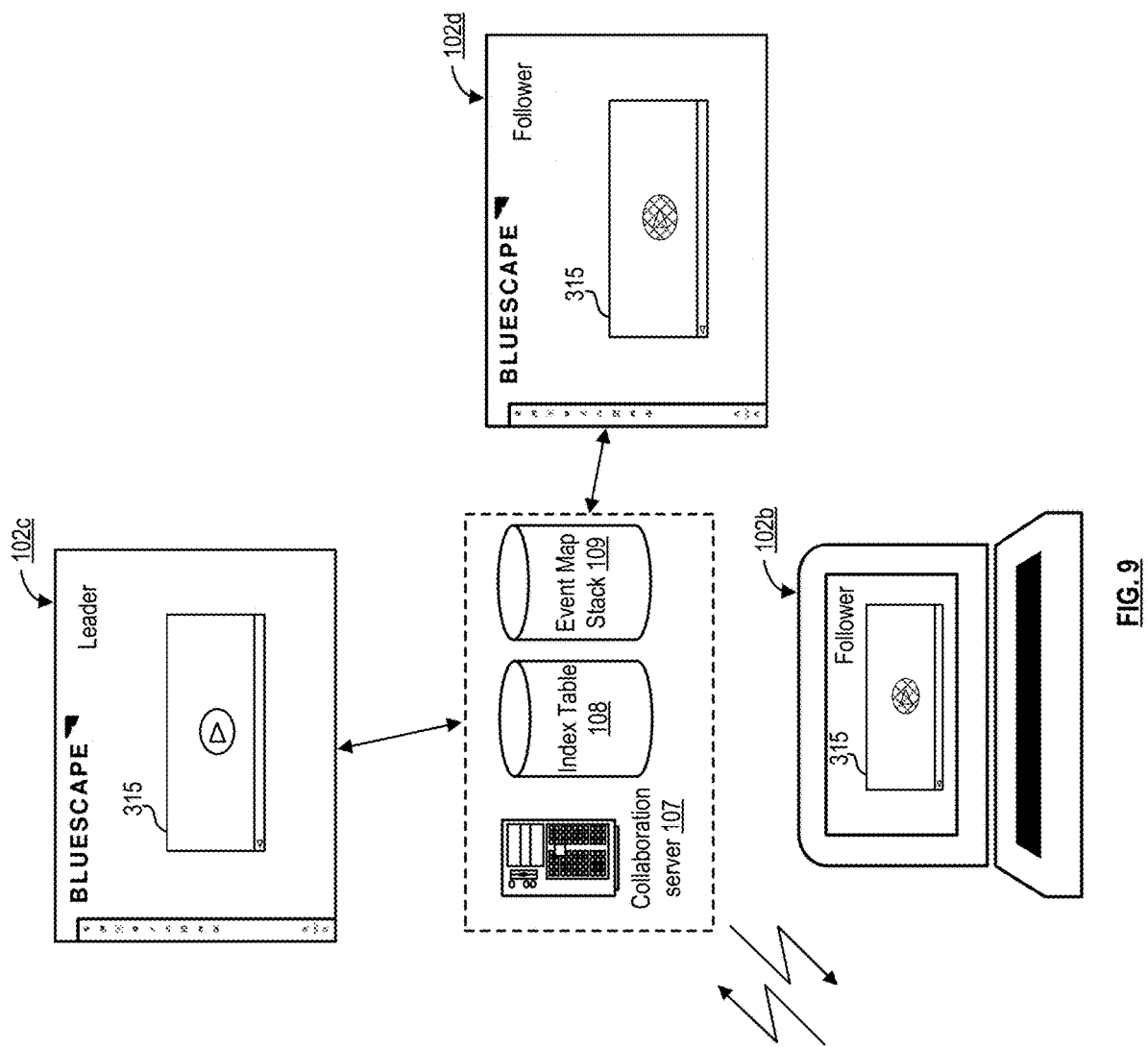
FIG. 9 illustrates two follower client-side nodes playing a video synchronized to the video playback at a leader client-side node.

FIG. 9 shows a high-level architecture of a collaboration system in which a leader client-side node 102c and two follower client-side nodes 102b and 102d are shown in communication with the collaboration server 107. A video player 315 is shown on the display clients of the leader and follower client-side nodes. The video controls (such as a play button) is disabled on the video player at the follower client-side nodes. We now present illustrations of example video controls on the leader and the follower client-side nodes in FIGS. 10A to 10D.

Figure 10A:
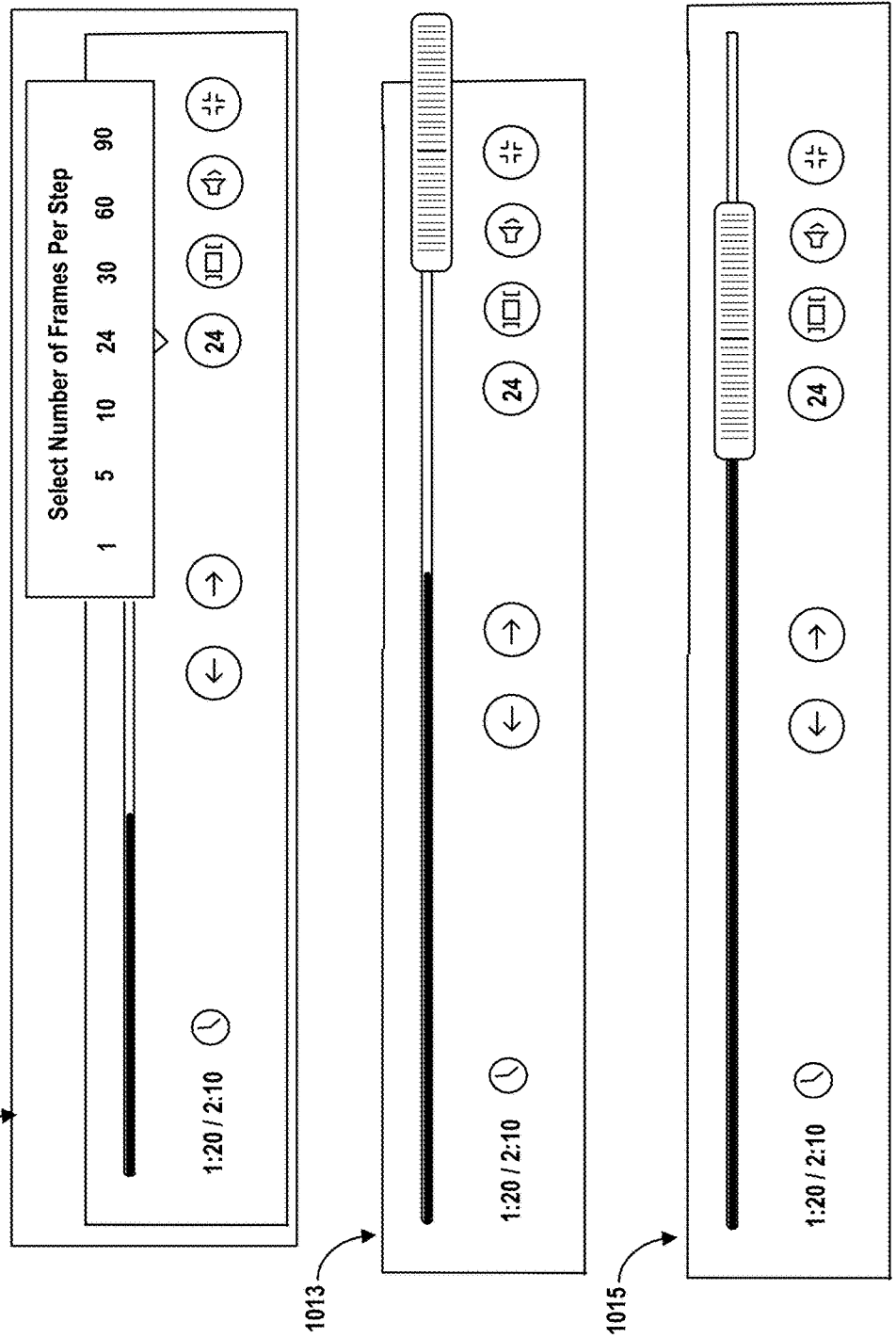

FIG. 10A shows three views of video controls 1011, 1013, and 1015. The user interface 1011 shows an example of video controls at the leader client-side node in which the video content can be moved forward or backward in steps.

The user interface of the video player can be used to set number of frames to move forward (or backward) in one step. The example illustrates a user interface element to select the number of frames by which the user can move the video forward or backward. The user interface element displays a message "select number of frames per step". In this example, the participant at the leader client-side node can set a value of 1, 5, 10, 24, 30, 60, and 90 frames to move forward or backward in one step. Other values of the number of frames per step to move forward and backward can be used. The user interface example 1013 shows a user interface element which can be used to move the video content forward or backward on a frame by frame basis. The user interface element is positioned outside the container in which other video control elements are positioned. The user interface example 1015 shows video controls for frame by frame forward or backward movement of the video playback. In this user interface example, the frame by frame control is positioned inside the container in which other video control elements are positioned.

Figure 10B:
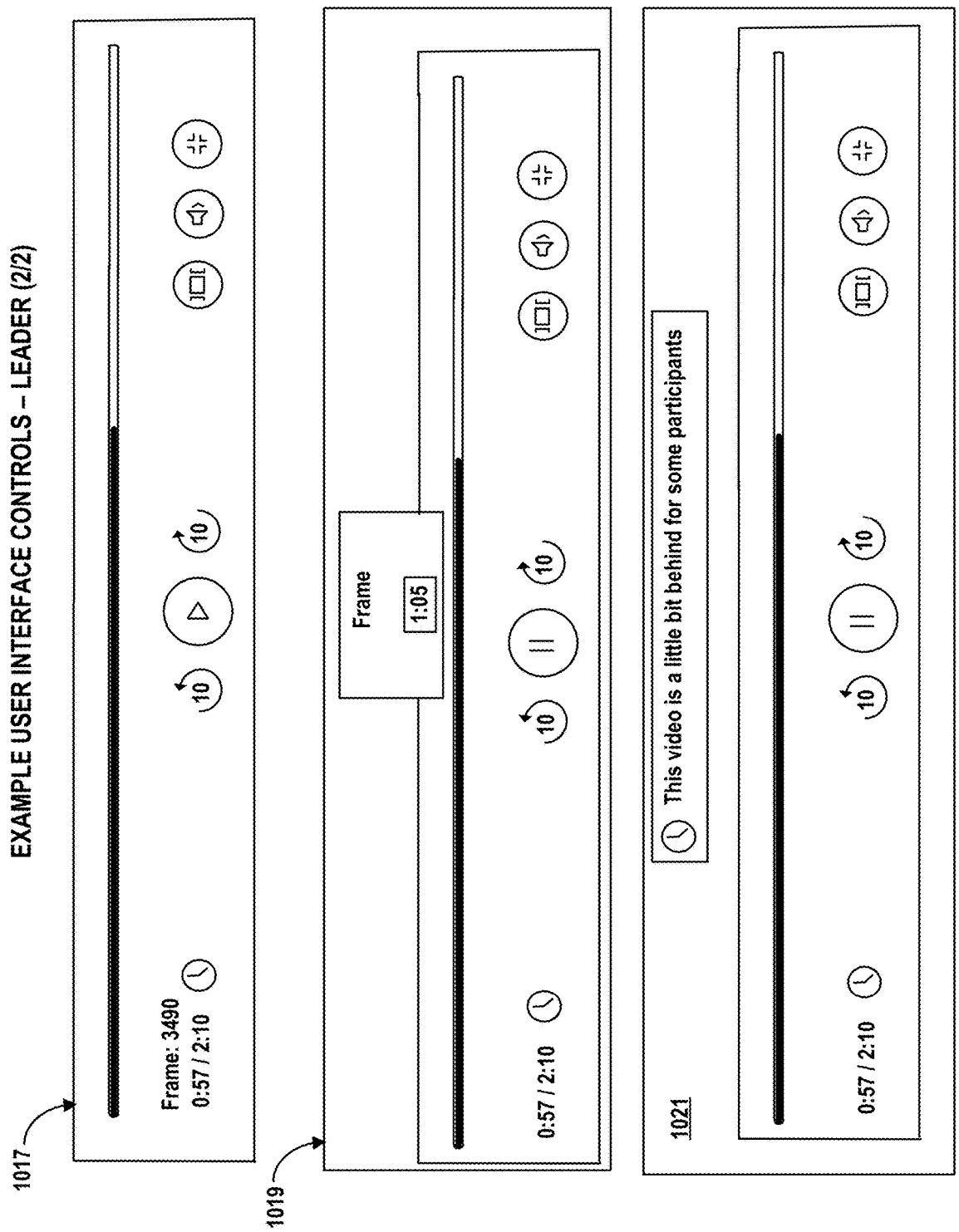

FIG. 10B includes three examples of video controls for a video player at the leader client-side node. The example 1017 shows user interface elements for a paused video in a video player on leader client-side node. The video playback can be started again by pressing the play button on the user interface. The example 1019 shows video player controls with hover feature. The hover feature displays a small video frame on top of the video scroll bar (or scrubber) when a user moves a pointer to a position over or near the scroll bar. The small video frame corresponds to the frame represented by a display time corresponding to a time on the position of the scroll bar at which the pointer is positioned. The example 1021 shows a message displayed on the video player of a leader. The message "the video is a little bit behind for some participants" indicates that some followers' video playback is not synchronized to the leader's video playback.

Figure 10C:
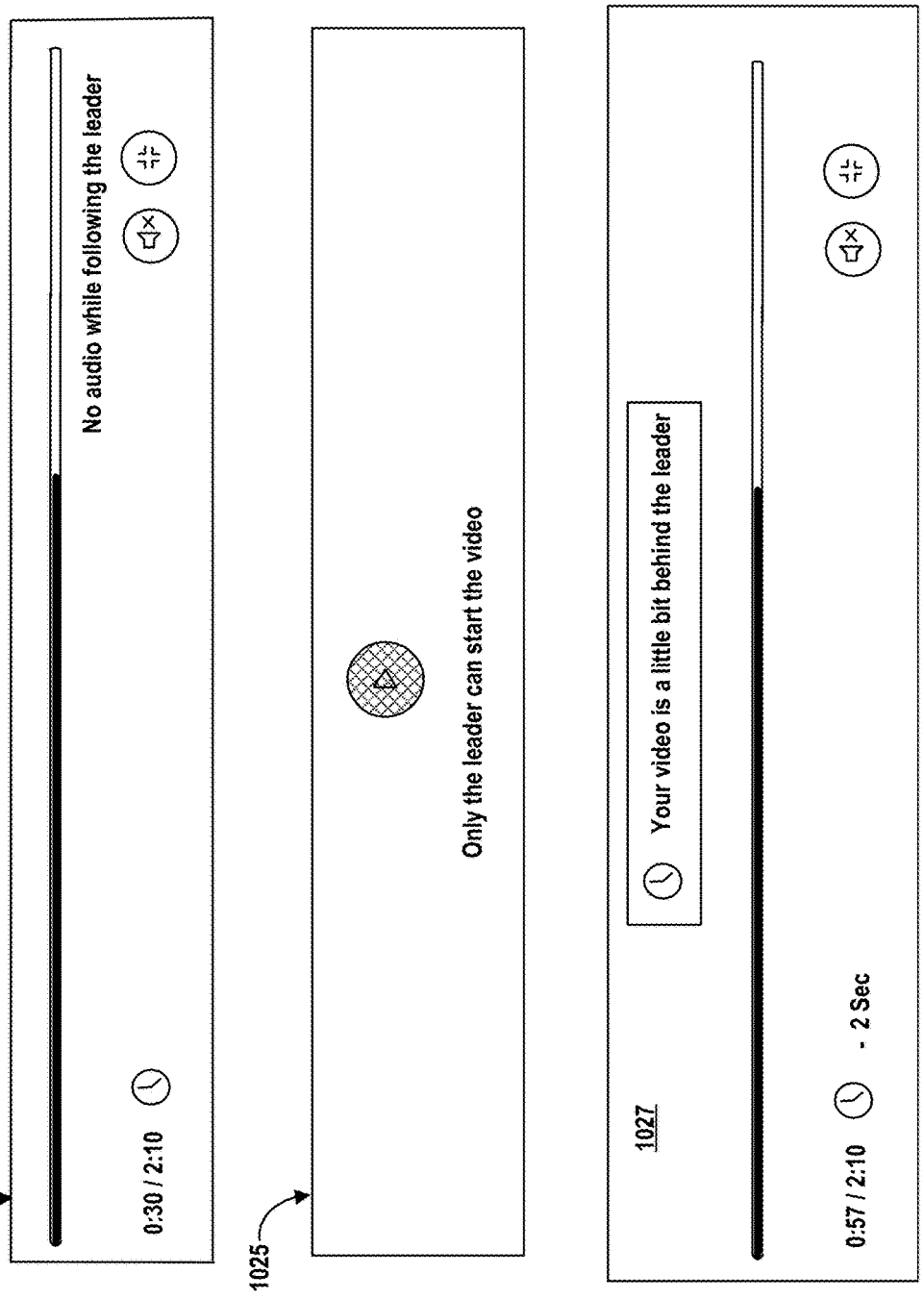

FIG. 10C presents three examples of video controls for video player at the follower client-side nodes. The example 1023 shows that audio is muted on a follower participant's video player. The user interface of the follower displays a message "No audio while following the leader". The audio control on the user interface displays with a cross beside it, indicating the audio is muted. The follower can click the audio control to turn on the sound. The example 1025 shows a paused video on a video player at a follower client-side node. The user interface shows a message "only the leader can start the video" and a disabled play button is displayed. The video playback can be started by the leader. When the leader starts the video, the video will start playing on the user interface of the follower client-side node in a synchronized manner with the leader client-side node. The example 1027 shows a message "your video is a little bit behind the leader" displayed on the display screen of video player at follower client-side node. The system can display this message on video player to indicate that the video playback at the follower client-side node is not synchronized to a leader client-side node. FIG. 10D presents an example user interface for a video that includes annotations. The colored markers on the scroll bar can indicate presence of annotations in the frames that have time stamps corresponding to the playback time of the video. The user interface can also include annotation tools such as pens, paintbrush, text boxes, etc. The user can use the annotation tools to add annotations to a video frame when reviewing that frame during a collaboration session.

FIGS. 11A-11G represent data structures which can be part of workspace data maintained by the index table database 108 and event map stack database 109 at the collaboration server 107. In FIG. 11A, an event data structure is illustrated. An event is an interaction with the workspace that can result in a change in workspace data. An interaction event can occur during a collaboration, therefore the event can include the meeting identifier identifying the collaboration. An event can include an event identifier, a category identifier, a user identifier, a time stamp, a session identifier, an event type parameter, the client identifier, and an array of locations in the workspace, which can include one or more locations for the corresponding event. It is desirable for example that the time stamp have resolution on the order of milliseconds or even finer resolution, in order to minimize the possibility of race conditions for competing events affecting a single object. Also, the event data structure can include a UI target, which identifies an object in the workspace data to which a stroke on a touchscreen at a client display is linked. Events can include video events, which indicate the interaction of the user with the video player. Events can include style event, which include display parameters. The events can include a text type event, which indicates entry, modification or movement in the workspace of a text object. The events can include a card type event, which indicates the creation, modification or movement in the workspace of a card type object. The events can include a stroke type event which identifies a location array for the stroke, and display parameters for the stroke, such as colors and line widths for example.

Events can be classified as persistent, history events and as ephemeral events. Processing of the events for addition to workspace data and sharing among users can be dependent on the classification of the event. This classification can be inherent in the event type parameter, or an additional flag or field can be used in the event data structure to indicate the classification.

A spatial event map can include a log of events having entries for history events, where each entry comprises a structure such as illustrated in FIG. 11A. The server-side network node includes logic to receive messages carrying ephemeral and history events from client-side network nodes, and to send the ephemeral events to other client-side network nodes without adding corresponding entries in the log, and to send history events to the other client-side network nodes while adding corresponding entries to the log. The events data structure can include display time stamps or presentation time stamps, the video identifier, and video player type.

FIG. 11B presents an actions data structure. The actions data structure includes information related to the video events such as the action identifier, action type, client type, etc. The action type can include different video events such as the play event, pause event, stop event, resume event, seek event, load event and unload event. These events are generated from a leader client-side node. The follower client-side node can generate ask video, join video, or late video events. The client type can indicate whether the event is from a leader client-side node or a follower client-side node.

FIG. 11C presents a meetings data structure. The meeting data structure can be used to identify a meeting. The system can use the information received from external systems such as scheduling and conferencing systems to identify meeting attributes. The meeting data structure can store a meeting identifier, the start time of the meeting and end time of the meeting. The meeting data structure can also include user identifiers of users who are participating in the meeting, an identifier of the meeting owner or meeting organizer, a number of participants in the meeting, etc.

FIG. 11D illustrates a card data structure. The card data structure can provide a cache of attributes that identify current state information for an object in the workspace data, including a session identifier, a card type identifier, an array identifier, the client identifier, dimensions of the cards, type of file associated with the card, and a session location within the workspace.

FIG. 11E illustrates a data structure which consolidates a number of events and objects into a catchable set called a chunk. The data structure includes a session ID, and identifier of the events included in the chunk, and a time stamp at which the chunk was created.

FIG. 11F illustrates the data structure for links to a user participating in a session in a chosen workspace. This data structure can include an access token, the client identifier for the session display client, the user identifier linked to the display client, a parameter indicating the last time that a user accessed a session, and expiration time and a cookie for carrying various information about the session. This information can, for example, maintain a current location within the workspace for a user, which can be used each time that a user logs in to determine the workspace data to display at a display client to which the login is associated. A user session can also be linked to a meeting. One or more users can participate in a meeting. A user session data structure can identify the meeting in which a user participated in during a given collaboration meeting. Linking a user session to a meeting enables the technology disclosed to determine the identification of the users and the number of users who participated in the meeting.

FIG. 11G illustrates a display array data structure which can be used in association with large-format displays that are implemented by federated displays, each having a display client. The display clients in such federated displays cooperate to act as a single display. The workspace data can maintain the display array data structure, which identifies the array of displays by an array ID and identifies the session position of each display. Each session position can include an x-offset and a y-offset within the area of the federated displays, a session identifier, and a depth.

The system can encrypt communications with client-side network nodes and can encrypt the database in which the spatial event maps are stored. Also, on the client-side network nodes, cached copies of the spatial event map are encrypted in some embodiments, to prevent unauthorized access to the data by intruders who gain access to the client-side computers.

Figure 12:
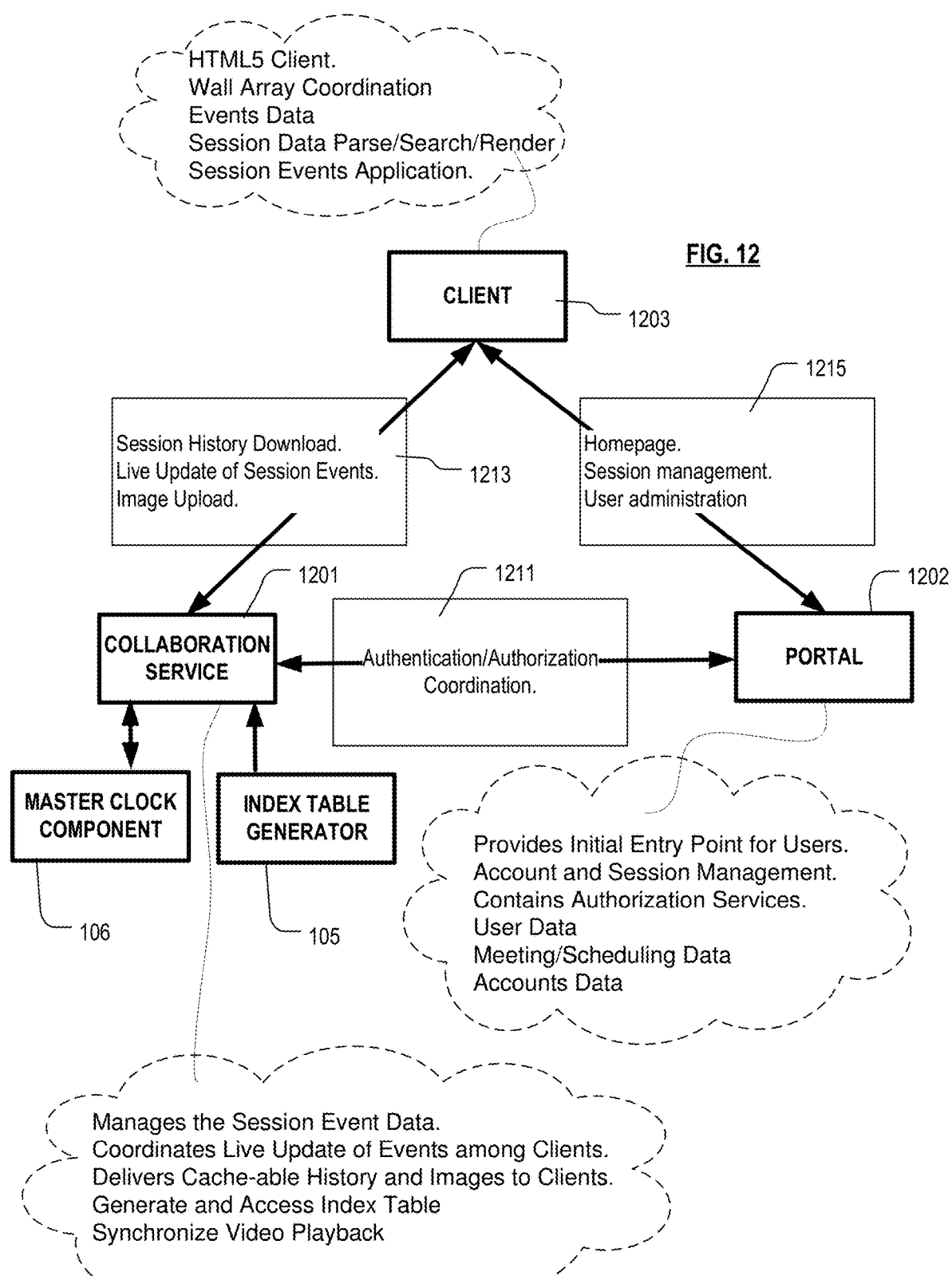
FIG. 12 is a simplified functional architecture for a distributed collaboration system.

FIG. 12 is a diagram representing a functional architecture for a distributed collaboration system used to create, modify, distribute and display workspace data for a workspace. The basic configuration includes a collaboration service 1201 which manages display mappings and event data executed by a server, such as collaboration service 1201, a portal service 1202 which can be executed by a server such as collaboration server 107 or located in other computer systems accessible to the server, such as a peer network node, and a display client 1203 located at a client-side network node, at which the user interaction is active. The display client 1203 is in communication with the collaboration service 1201 and with the portal 1202. The communication channel 1213 between the display client 1203 and a collaboration service 1201 manages the download of session history, and the live update of session events. Also, across this communication channel 1213, a display client 1203 can upload images that can be associated with events to the collaboration service 1201. The collaboration service 1201 uses the communication channel to send messages to client-side nodes. The collaboration service 1201 also uses the communication channel 1213 to receive messages from client-side nodes. The collaboration service is in communication with a master clock component 106. The master clock component implements the logic to process video events received from client-side nodes. It includes the casting microservice to send follower video events to follower client-side nodes. The collaboration service is also in communication with the index table generator 105.

The display client 1203 is in communication with the portal 1202 across communication channel 1223. The portal 1202 manages a homepage for the workspace data (also referred to as shared digital workspace), session management and user administration. This portal can be utilized for user login, authentications, and for delivering image files and the like as an alternative to, and in parallel with, the communication channel 1213. The collaboration service 1201 and portal 1202 are in communication across channel 1212. The collaboration service 1201 and portal 1202 manage authentication and authorization protocols, and coordinate session administration, and workspace data management.

The display client 1203 can be part of a client-side network node including a physical or virtual computer system having computer programs stored in accessible memory that provide logic supporting the collaboration, including an HTML 5 client, wall array coordination logic for display array implementations, workspace data parsing searching and rendering logic, and a session events application to manage live interaction with workspace data at the server and the display wall.

The portal 1202 can be part of a server-side network node including a physical or virtual computer system having computer programs stored in accessible memory, that provide logic supporting user access to the collaboration server. The logic can include applications to provide initial entry points for users, such as a webpage with login resources, logic to manage user accounts and session anticipation, logic that provides authorization services, such as OAuth-based services, and account data.

The collaboration service 1201 can be part of a server-side network node including, and can manage the session event data, coordinate updated events among clients, deliver catchable history and images to clients, and control access to a database stored in the workspace data. The collaboration service communicates with a classification engine that can classify interaction events into categories.

A spatial event map system can include an API executed in coordination by client-side and server-side resources including any number of physical and virtual machines. One example of an API is described below. An API can be defined in a variety of ways, while including the elements supporting maintenance of a spatial event map in a server-side network node or nodes and supporting sharing of the spatial event map with one or a plurality of active client-side network nodes. In this example, the API is broken down in this example into processes managed by two servers:

Socket Requests Server (Websockets)—used for updating clients with relevant data (new strokes, cards, clients, etc.) once connected. Also handles the initial connection handshake.

Service Requests Server (HTTP/REST)—used for cacheable responses, as well as posting data (i.e. images and cards)

Client-side network nodes are configured according to the API and include corresponding socket requests clients and service requests clients.

History Event

All persistent events are sent as HistoryEvent. This includes for example, moving windows, setting text, deleting windows, creating windows. HistoryEvents are written to the session's history and returned when the history is retrieved. HistoryEvents are sent to the server without an eventId. The server assigns an eventId and broadcasts the event to all clients (including the originating client). New object ids can be reserved using the oid message.

Basic Message Format

// server←client [client-id, "he", target-id, event-type, event-properties]
    client-id—(string) the ID of the originating client
    target-id—(string) the ID of the target object/widget/app to which this event is relevant
    event-type—(string) an arbitrary event type
    properties—(object) a JSON object describing pertinent key/values for the event.
    // server→client[client-id, "he", target-id, event-id, event-type, event-properties]
    client-id—(string) the ID of the originating client
    target-id—(string) the ID of the target window to which this event is relevant
    event-id—(string) the ID of the event in the database
    event-type—(string) an arbitrary event type
    properties—(object) a JSON object describing pertinent key/values for the event.

// server→client format of 'he' is: [<clientId>, <messageType>, <targetId>, <eventId>, Note: The eventId will also be included in history that is fetched via the HTTP API.

History Events by Object/Application Type

Session
    Create—Add a note or image on the work session
    stroke—Add a pen or eraser stroke on the background Note
    text—Sets or update the text and/or text formatting of a note.
    delete—Remove the note from the work session
    position—Update the size or location of the note in the work session
    pin—Pin or unpin the note
    stroke—Add a pen or eraser stroke on top of the image Image
    delete—Remove the note from the work session
    position—Update the size or location of the note in the work session
    pin—Pin or unpin the note
    stroke—Add a pen or eraser stroke on top of the image Volatile Event Volatile events are ephemeral events not recorded in the undo/playback event stream, so they're good for in-progress streaming events like dragging a card around the screen, and once the user lifts their finger, a HistoryEvent is used to record its final place.

// server↔client[client-id, "ye", target-id, event-type, event-properties]
    client-id—(string) the ID of the originating client
    target-id—(string) the ID of the target window to which this event is relevant
    event-type—(string) an arbitrary event type
    properties—(object) a JSON object describing pertinent key/values for the event.

Figure 13:
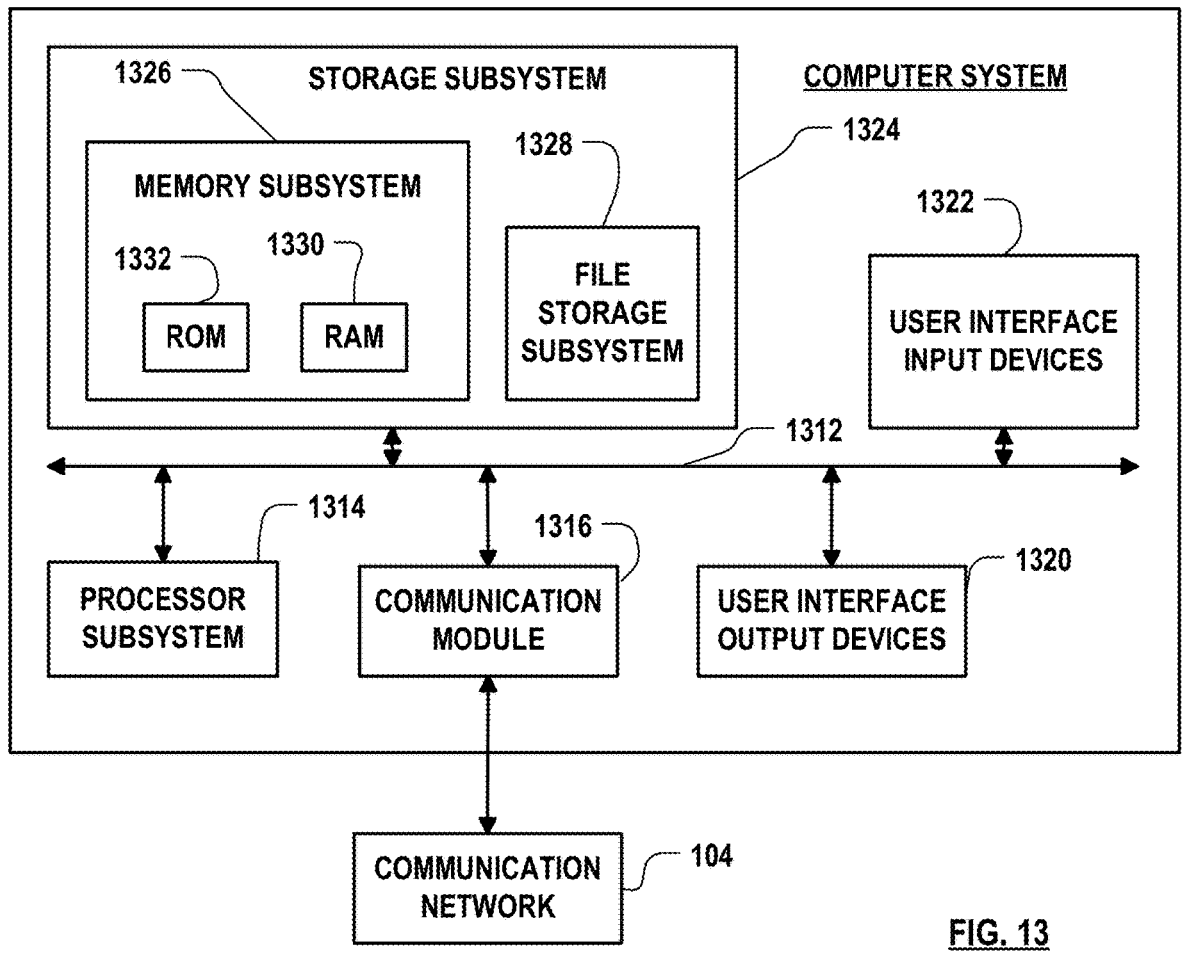
FIG. 13 is a simplified block diagram of the computer system 110, e.g. a client device computer system (FIG. 1B).

FIG. 13 is a simplified block diagram of a computer system, or network node, which can be used to implement the client-side functions (e.g. computer system 110) or the server-side functions (e.g. server 107) in a distributed collaboration system. A computer system typically includes a processor subsystem 1314 which communicates with a number of peripheral devices via bus subsystem 1312. These peripheral devices may include a storage subsystem 1324, comprising a memory subsystem 1326 and a file storage subsystem 1328, user interface input devices 1322, user interface output devices 1320, and a communication module 1316. The input and output devices allow user interaction with the computer system. Communication module 1316 provides physical and communication protocol support for interfaces to outside networks, including an interface to communication network 104, and is coupled via communication network 104 to corresponding communication modules in other computer systems. Communication network 104 may comprise many interconnected computer systems and communication links. These communication links may be wireline links, optical links, wireless links, or any other mechanisms for communication of information, but typically it is an IP-based communication network, at least at its extremities. While in one embodiment, communication network 104 is the Internet, in other embodiments, communication network 104 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1322 may include a keyboard, pointing devices such as a mouse, trackball, touchpad, or graphics tablet, a scanner, a touch screen incorporated into the display (including the touch sensitive portions of large format digital display such as 102c), audio input devices such as voice recognition systems, microphones, and other types of tangible input devices. In general, use of the term "input device" is intended to include all possible types of devices and ways to input information into the computer system or onto computer network 104.

User interface output devices 1320 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. In the embodiment of FIG. 1B, it includes the display functions of large format digital display such as 102c. The display subsystem may also provide non-visual display such as via audio output devices. In general, use of the term "output device" is intended to include all possible types of devices and ways to output information from the computer system to the user or to another machine or computer system.

Storage subsystem 1324 stores the basic programming and data constructs that provide the functionality of certain embodiments of the present invention.

The storage subsystem 1324 when used for implementation of server-side network-nodes, comprises a product including a non-transitory computer readable medium storing a machine readable data structure including a spatial event map which locates events in a workspace, wherein the spatial event map includes a log of events, entries in the log having a location of a graphical target of the event in the workspace and a time. Also, the storage subsystem 1324 comprises a product including executable instructions for performing the procedures described herein associated with the server-side network node.

The storage subsystem 1324 when used for implementation of client-side network-nodes, comprises a product including a non-transitory computer readable medium storing a machine readable data structure including a spatial event map in the form of a cached copy as explained below, which locates events in a workspace, wherein the spatial event map includes a log of events, entries in the log having a location of a graphical target of the event in the workspace and a time. Also, the storage subsystem 824 comprises a product including executable instructions for performing the procedures described herein associated with the client-side network node.

For example, the various modules implementing the functionality of certain embodiments of the invention may be stored in storage subsystem 1324. These software modules are generally executed by processor subsystem 1314.

Memory subsystem 1326 typically includes a number of memories including a main random-access memory (RAM) 1330 for storage of instructions and data during program execution and a read only memory (ROM) 1332 in which fixed instructions are stored. File storage subsystem 1328 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs and may be stored by file storage subsystem 1328. The host memory 1326 contains, among other things, computer instructions which, when executed by the processor subsystem 1314, cause the computer system to operate or perform functions as described herein. As used herein, processes and software that are said to run in or on "the host" or "the computer," execute on the processor subsystem 1314 in response to computer instructions and data in the host memory subsystem 1326 including any other local or remote storage for such instructions and data.

Bus subsystem 1312 provides a mechanism for letting the various components and subsystems of a computer system communicate with each other as intended. Although bus subsystem 1312 is shown schematically as a single bus, alternative embodiments of the bus subsystem may use multiple busses.

The computer system itself can be of varying types including a personal computer, a portable computer, a workstation, a computer terminal, a network computer, a television, a mainframe, a server farm, or any other data processing system or user device. In one embodiment, a computer system includes several computer systems, each controlling one of the tiles that make up the large format display such as 102c. Due to the ever-changing nature of computers and networks, the description of computer system 110 depicted in FIG. 13 is intended only as a specific example for purposes of illustrating the preferred embodiments of the present invention. Many other configurations of the computer system are possible having more or less components than the computer system depicted in FIG. 13. The same components and variations can also make up each of the other devices 102, and 101 in the collaboration environment of FIG. 1, as well as the collaboration server 107 and databases 108 and 109.

Certain information about the drawing regions active on the digital display 102c are stored in a database accessible to the computer system 110 of the display client. The database can take on many forms in different embodiments, including but not limited to a MongoDB database, an XML database, a relational database or an object-oriented database.

Figure 14:
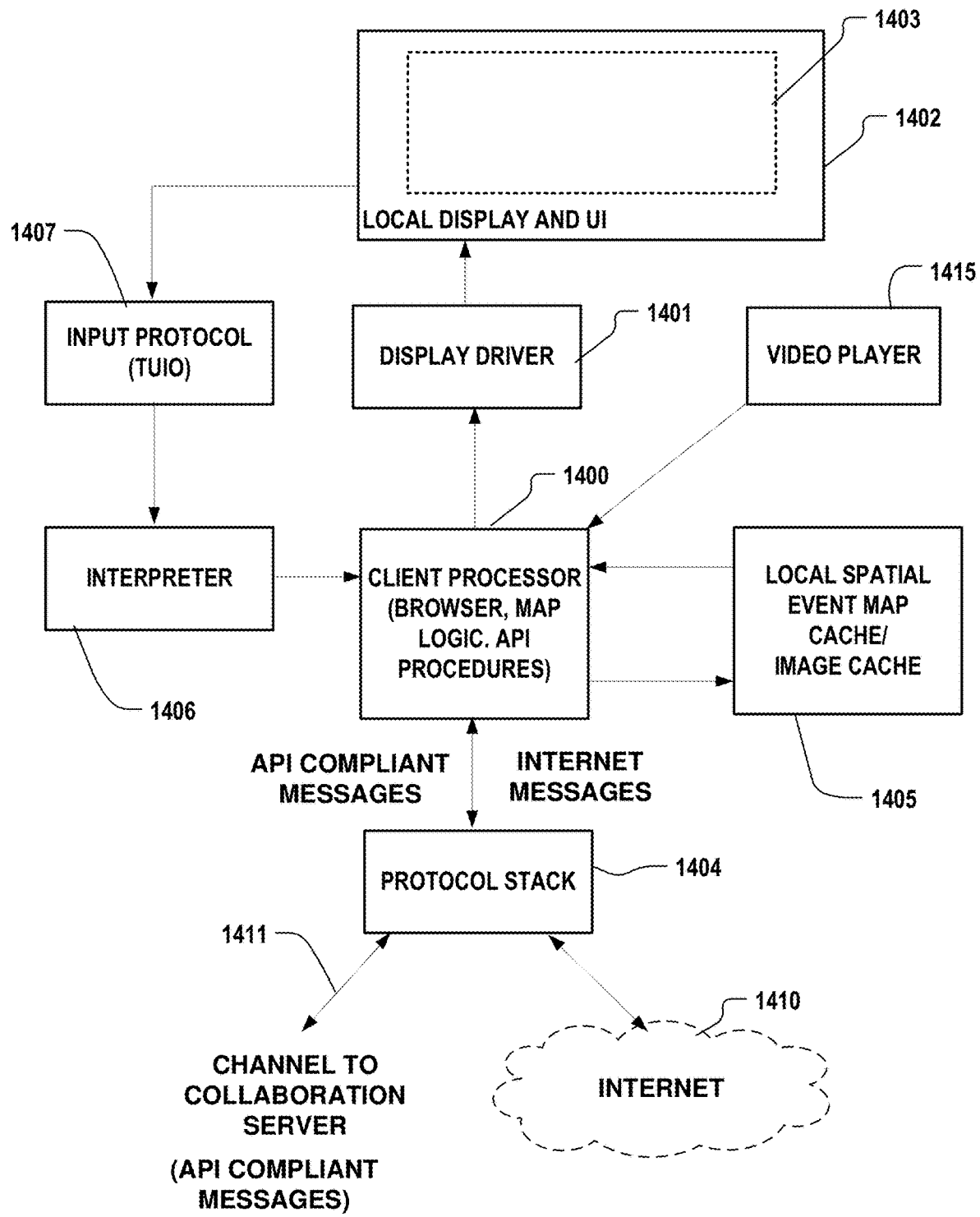
FIG. 14 is a simplified functional block diagram of a client-side network node and display.

FIG. 14 is a simplified diagram of a client-side network node, including a client processor 1400, a display driver 1401, a local display and user interface such as a touchscreen 1402, a protocol stack 1404 including a communication interface controlled by the stack, local memory 1405 storing a cache copy of the live spatial event map and a cache of images and other graphical constructs used in rendering the displayable area, and input protocol device 1407 which executes a input protocol which translates input from a tangible user input device such as a touchscreen, or a mouse, into a form usable by a command interpreter 1406. A suitable input protocol device 1407 can include software compatible with a TUIO industry-standard, for example for interpretation of tangible and multi-touch interaction with the display wall. The protocol stack 1404 receives API compliant messages and Internet messages from the client processor 1400 and as discussed above includes resources to establish a channel 1411 to a collaboration server across which API compliant messages can be exchanged, and a link 1410 to the Internet in support of other communications that serve the local display 1402. A video player 1415 can also be in communication with the client processor 1400 to send video related data such as video events. The client processor can then pass the meeting related data to the collaboration server. The display driver 1401 controls a displayable area 1403 on the local display 1402. The displayable area 1403 can be logically configured by the client processor or other programming resources in the client-side network node. Also, the physical size of the displayable area 1403 can be fixed for a given implementation of the local display. The client processor 1400 can include processing resources such as a browser, mapping logic used for translating between locations on the displayable area 1203 and the workspace, and logic to implement API procedures.

The client-side network node shown in FIG. 14 illustrates an example including an application interface including a process to communicate with the server-side network node. The client-side network node shown in FIG. 14 illustrates an example configured according to an API, wherein the events include a first class of event designated as history events to be distributed among other client-side network nodes and to be added to the spatial event log in the server-side network node, and a second class of event designated as ephemeral to be distributed among other client-side network nodes but not added to the spatial event log in the server-side network node.

Figure 15:
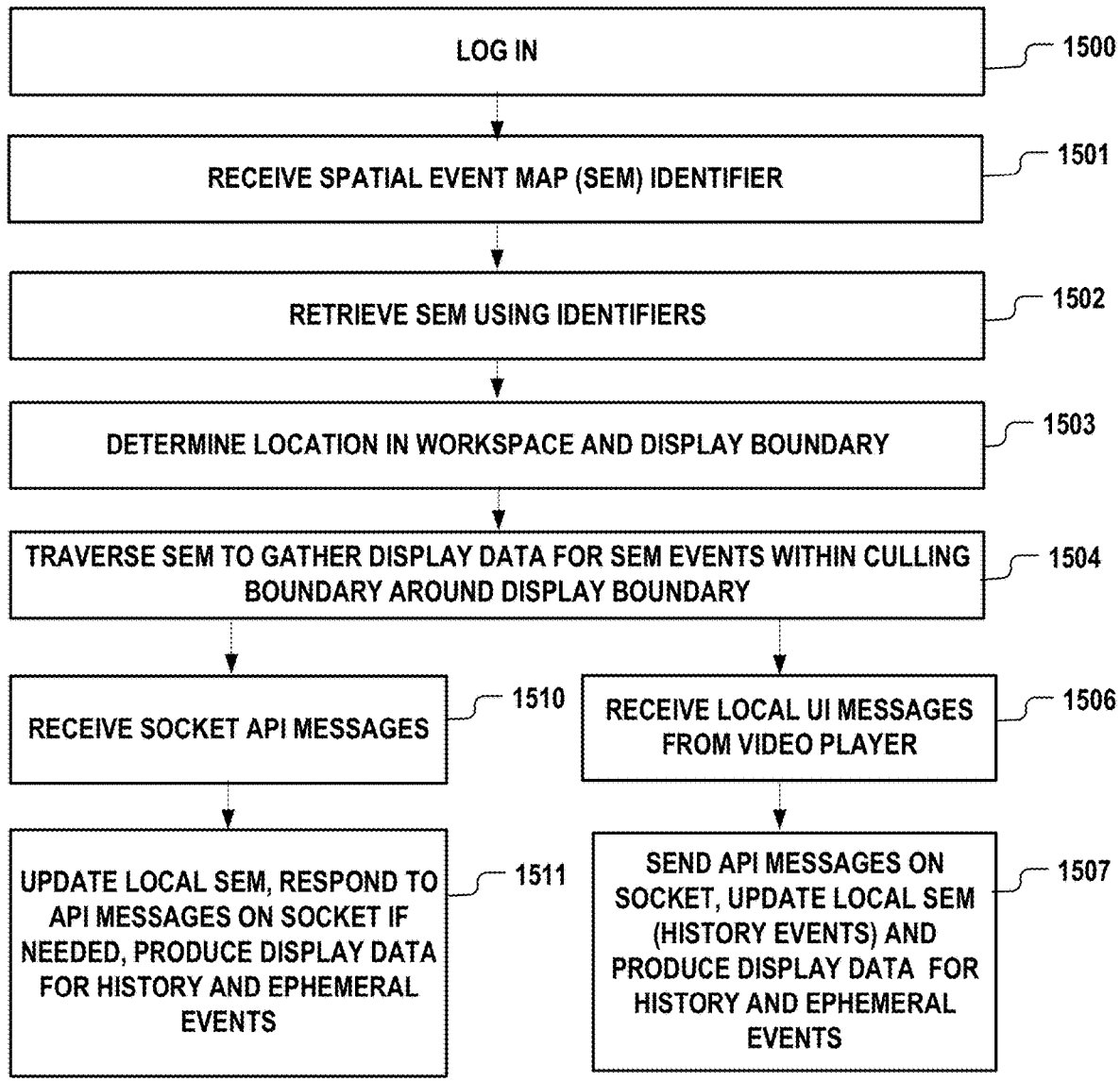
FIG. 15 is a flowchart illustrating operation of client-side network node like that of FIG. 14.

FIG. 15 is a simplified flow diagram of a procedure executed by the client-side network node. The order illustrated in the simplified flow diagram is provided for the purposes of illustration and can be modified as suits a particular implementation. Many of the steps for example, can be executed in parallel. In this procedure, a client login is executed (1500) by which the client is given access to a specific collaboration session and its spatial event map. The collaboration server provides an identifier of, or identifiers of parts of, the spatial event map which can be used by the client to retrieve the spatial event map from the collaboration server (1501). The client retrieves the spatial event map, or at least portions of it, from the collaboration server using the identifier or identifiers provided (1502).

For example, the client can request all history for a given workspace to which it has been granted access as follows:
curl http://localhost:4545/<sessionId>/history
The server will respond with all chunks (each its own section of time):
["/<sessionId>/history/<startTime>/<endTime>?b=1"]
["/<sessionId>/history/<startTime>/<endTime>?b=1"]
For each chunk, the client will request the events:
Curl http://localhost:4545/<sessionId>/history/<startTime>/<endTime>?b=<cache-buster>
Each responded chunk is an array of events and is cacheable by the client:

```
[
    [
    4,
    "sx",
    "4.4",
    [537, 650, 536, 649, 536, 648, ...],
    {
       "size": 10,
       "color": [0, 0, 0, 1],
       "brush": 1
    },
    1347644106241,
    "cardFling"
    ]
]
```

The individual messages might include information like position on screen, color, width of stroke, time created etc.

The client then determines a location in the workspace, using for example a server provided focus point, and display boundaries for the local display (1503). The local copy of the spatial event map is traversed to gather display data for spatial event map entries that map to the displayable area for the local display. In some embodiments, the client may gather additional data in support of rendering a display for spatial event map entries within a culling boundary defining a region larger than the displayable area for the local display, in order to prepare for supporting predicted user interactions such as zoom and pan within the workspace (1504). The client processor executes a process using spatial event map events, ephemeral events and display data to render parts of the spatial event map that fall within the display boundary (1505). This process receives local user interface messages, such as from the TUIO driver (1506). Also, this process receives socket API messages from the collaboration server (1510). In response to local user interface messages, the process can classify inputs as history events and ephemeral events, send API messages on the socket to the collaboration server for both history events and ephemeral events as specified by the API, update the cached portions of the spatial event map with history events, and produce display data for both history events and ephemeral events (1507). In response to the socket API messages, the process updates the cached portion of the spatial event map with history events identified by the server-side network node, responds to API messages on the socket as specified by the API, and produce display data for both history events and ephemeral events about which it is notified by the socket messages (1511).

Logging in and downloading spatial event map.
1. The client request authorization to join a collaboration session and open a workspace.
2. The server authorizes the client to participate in the session and begin loading the spatial event map for the workspace.
3. The client requests an identification, such as a "table of contents" of the spatial event map associated with the session.
4. Each portion of the spatial event map identified in the table of contents is requested by the client. These portions of the spatial event map together represent the workspace as a linear sequence of events from the beginning of workspace-time to the present. The "beginning of workspace-time" can be considered an elapsed time from the time of initiation of the collaboration session, or an absolute time recorded in association with the session.
5. The client assembles a cached copy of the spatial event map in its local memory.
6. The client displays an appropriate region of the workspace using its spatial event map to determine what is relevant given the current displayable area or viewport on the local display.

Connecting to the session channel of live spatial event map events:
1. After authorization, a client requests to join a workspace channel.
2. The server adds the client to the list of workspace participants to receive updates via the workspace channels.
3. The client receives live messages from the workspace that carry both history events and ephemeral events, and a communication paradigm like a chat room. For example, a sequence of ephemeral events, and a history event can be associated with moving object in the spatial event map to a new location in the spatial event map.
4. The client reacts to live messages from the server-side network node by altering its local copy of the spatial event map and re-rendering its local display.
5. Live messages consist of "history" events which are to be persisted as undue-double, recorded events in the spatial event map, and "ephemeral" events which are pieces of information that do not become part of the history of the session.
6. When a client creates, modifies, moves or deletes an object by interaction with its local display, a new event is created by the client-side network node and sent across the workspace channel to the server-side network node. The server-side network node saves history events in the spatial event map for the session and distributes both history events and ephemeral events to all active clients in the session.
7. When exiting the session, the client disconnects from the workspace channel.

A collaboration system can have many, distributed digital displays which are used both to display images based on workspace data managed by a shared collaboration server, and to accept user input that can contribute to the workspace data, while enabling each display to rapidly construct an image to display based on session history, real time local input and real-time input from other displays.

Technology described herein includes for a network including a server in one or more server-side nodes and a plurality of client-side nodes, a method for synchronizing playback of a video at the plurality of client-side nodes, the method including:
  sending a play video message from a first client-side node identifying a play video event including a play event time corresponding to a time of a user input at the first client-side node to start play of a video at the first client-side node;

receiving a follower play video message at a follower set of one or more other client-side nodes (identifying the play video event and) including a starting frame identifier, in response to which the one or more other client-side nodes in the follower set can start playing the video at a frame corresponding to the starting frame identifier;

sending a sync video message from the first client-side node identifying a sync video event including a sync event time; and receiving a follower sync video message at the follower set of one or more other client-side nodes (identifying the sync video event and) including a sync frame identifier, in response to which the one or more other client-side nodes in the follower set can synchronize playing the video at a frame corresponding to the sync frame identifier.

Also described is a system including one or more processors including or having access to memory loaded with computer instructions to synchronize playback of a video at a plurality of client-side nodes in a network including a server in one or more server-side nodes and the plurality of client-side nodes, the instructions, when executed on the processors, implement actions as just outlined.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Also as used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, though the displays described herein are of large format, small format displays can also be arranged to use multiple drawing regions, though multiple drawing regions are more useful for displays that are at least as large as 12 feet in width. In particular, and without limitation, any and all variations described, suggested by the Background section of this patent application or by the material incorporated by reference are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method including:
designating, at a server, a first client node as a leader node;
receiving, from the leader node, designation of a video to be synchronously played at a plurality of client nodes;
storing, at the server, an index table comprising sequential frame numbers and corresponding display time stamps for the video with each sequential frame number, of the sequential frame numbers, identifying a particular frame of the video;
receiving, at the server and from the first client node, a sync video message identifying a sync video event including a sync event time, wherein playback of the video is to be synchronized to the sync event time at one or more other client nodes in a follower set;
using, at the server, a mapping result prepared from the index table stored at the server, wherein the mapping result maps the sync event time to a sync frame identifier, the sync frame identifier including one sequential frame number for the video; and
sending, from the server, a follower sync video message to the one or more other client nodes in the follower set, the follower sync video message including the sync frame identifier, such that, in response to receiving the follower sync video message, the one or more other client nodes in the follower set can synchronize playback of the video at a frame corresponding to the frame number included in the sync frame identifier.

2. The method of claim 1, including:
receiving, at the server, a sequence of sync video messages including the sync video message, the sequence of sync video messages identifying respective sync video events including respective sync event times; and
sending, from the server and to the one or more other client nodes in the follower set, a sequence of follower sync video messages, including the sync video message.

3. The method of claim 1, further including:
executing an API at the server for the sync video message and the follower sync video message.

4. The method of claim 1, further including:
receiving, at the server, a load video message from the first client node in the plurality of client nodes identifying a load video event including an identifier of the video; and sending, from the server, a follower load video message to the one or more other client nodes in the follower set, the follower load video message including data identifying the video, in response to which the video can be downloaded at the one or more other client nodes.

5. The method of claim 4, further including:
receiving, at the server and from client nodes of the plurality of client nodes, acknowledgement messages after the sending of the follower load video message; and
listing client nodes in the follower set of the one or more other client nodes in response to receipt of the acknowledgement messages within a pre-determined cut-off time interval.

6. The method of claim 4, further including:
composing the index table comprising sequential frame numbers and corresponding display time stamps for the video in response to the load video event, wherein
the display time stamps are presentation time stamps and represent relative display times.

7. The method of claim 1, further including:
using a system configured for displaying views of a workspace on an interactive workspace display or an interactive display in a network including the server and the plurality of client nodes; and
delivering, from the server to client nodes of the plurality of client nodes, at least part of a log of entries to identify events in the workspace, the events identified by the entries in the log being related to graphical targets having coordinates within the workspace including a graphical object representing the video, wherein an entry in the log, which identifies an event, comprises data specifying coordinates of a location within the workspace of the graphical target related to the event, wherein a target identifier of the graphical target related to the event is to be displayed on a display of a client node and the target identifier includes a link to the video.

8. The method of claim 1, further including:
receiving, at the server, a pause video message from the first client node identifying a pause video event including a pause event time to pause play of the video at the first client node;
mapping, at the server, the pause event time to a pause frame identifier; and
sending, from the server, a follower pause video message to the one or more other client nodes in the follower set including the pause frame identifier, in response to which the one or more other client nodes in the follower set can synchronize pausing the video at a frame corresponding to the pause frame identifier;
receiving, at the server, a seek video message from the first client node identifying a seek video event including a seek event time to seek a frame in the video at the first client node;
mapping, at the server, the seek event time to a seek frame identifier; and
sending, from the server, a follower seek video message to the one or more other client nodes in the follower set including the seek frame identifier, in response to which the one or more other client nodes in the follower set can synchronize seeking the video at a frame corresponding to the seek frame identifier;
receiving, at the server, a resume video message from the first client node identifying a resume video event including a resume event time to resume play of the video at the first client node;
mapping, at the server, the resume event time to a resume frame identifier; and
sending, from the server, a follower resume video message to the one or more other client nodes in the follower set including the resume frame identifier, in response to which the one or more other client nodes in the follower set can synchronize resuming play of the video at a frame corresponding to the resume frame identifier;
receiving, at the server, an ask video message from an additional client node to enable synchronized playback of the video at the additional client node; and
sending, from the server, a next follower sync video message in a sequence of follower sync video messages, in response to which the additional client node can synchronize playing the video at a frame corresponding to the sync frame identifier;
receiving, at the server, a late video message from one of the client nodes in the follower set to synchronize playback of the video at the one of the client nodes in the follower set after the playback of the video has started on the first client node; and
sending, from the server, a next follower sync video message in the sequence of follower sync video messages, in response to which the one of the client nodes in the follower set can synchronize playing the video at a frame corresponding to the sync frame identifier.

9. The method of claim 8, including:
changing the designated leader node for the video from the first client node to another client node in the follower set.

10. The method of claim 1, further including:
receiving, at the server, a stop video message from the first client node identifying a stop video event including a stop event time to stop play of the video at the first client node;
mapping, at the server, the stop event time to a stop frame identifier; and
sending, from the server, a follower stop video message to the one or more other client nodes in the follower set including the stop frame identifier, in response to which the one or more other client nodes in the follower set can synchronize stopping play of the video at a frame corresponding to the stop frame identifier.

11. A non-transitory computer readable storage medium impressed with computer program instructions, the instructions, when executed, implementing a method including:
designating, at a server, a first client node as a leader node;
receiving, from the leader node, designation of a video to be synchronously played at a plurality of client nodes;
storing, at the server, an index table comprising sequential frame numbers and corresponding display time stamps for the video, with each sequential frame number, of the sequential frame numbers, identifying a particular frame of the video;
receiving, at the server and from the first client node, a sync video message identifying a sync video event including a sync event time, wherein playback of the video is to be synchronized to the sync event time at one or more other client nodes in a follower set;
using, at the server, a mapping result prepared from the index table stored at the server, wherein the mapping result maps the sync event time to a sync frame identifier, the sync frame identifier including one sequential frame number for the video; and
sending, from the server, a follower sync video message to the one or more other client nodes in the follower set, the follower sync video message including the sync frame identifier, such that, in response to receiving the follower sync video message, the one or more other client nodes in the follower set can synchronize playback of the video at a frame corresponding to the frame number included in the sync frame identifier.

12. A system including one or more processors including or having access to memory loaded with computer instructions, the instructions, when executed on the one or more processors, implementing actions comprising:
designating, at a server, a first client node as a leader node;
receiving, from the leader node, designation of a video to be synchronously played at a plurality of client nodes;
storing, at the server, an index table comprising sequential frame numbers and corresponding display time stamps for the video, with each sequential frame number, of the sequential frame numbers, identifying a particular frame of the video;
receiving, at the server and from the first client node, a sync video message identifying a sync video event including a sync event time, wherein playback of the video is to be synchronized to the sync event time at one or more other client nodes in a follower set;
using, at the server, a mapping result prepared from the index table stored at the server, wherein the mapping result maps the sync event time to a sync frame identifier, the sync frame identifier including one sequential frame number for the video; and
sending, from the server, a follower sync video message to the one or more other client nodes in the follower set, the follower sync video message including the sync frame identifier, such that, in response to receiving the follower sync video message, the one or more other client nodes in the follower set can synchronize playback of the video at a frame corresponding to the frame number included in the sync frame identifier.

13. The system of claim 12, further implementing actions comprising:
receiving, at the server, a sequence of sync video messages including the sync video message, the sequence of sync video messages identifying respective sync video events including respective sync event times; and
sending, from the server and to the one or more other client nodes in the follower set, a sequence of follower sync video messages, including the sync video message.

14. The system of claim 12, further implementing actions comprising:
executing an API at the server for the sync video message and the follower sync video message.

15. The system of claim 14, the API further implementing actions comprising:
receiving, at the server, a load video message from the first client node in the plurality of client nodes identifying a load video event including an identifier of the video; and
sending, from the server, a follower load video message to the one or more other client nodes in the follower set, the follower load video message including data identifying the video, in response to which the video can be downloaded at the one or more other client nodes.

16. The system of claim 15, the API further implementing actions comprising:
receiving, at the server and from client nodes of the plurality of client nodes, acknowledgement messages after the sending of the follower load video message; and
listing client nodes in the follower set of the one or more other client nodes in response to receipt of the acknowledgement messages within a pre-determined cut-off time interval.

17. The system of claim 15, further implementing actions comprising:
composing the index table comprising sequential frame numbers and corresponding display time stamps for the video in response to the load video event, wherein
the display time stamps are presentation time stamps and represent relative display times.

18. The system of claim 14, the API further implementing actions comprising:
receiving, at the server, a pause video message from the first client node identifying a pause video event including a pause event time to pause play of the video at the first client node;
mapping, at the server, the pause event time to a pause frame identifier; and
sending, from the server, a follower pause video message to the one or more other client nodes in the follower set including the pause frame identifier, in response to which the one or more other client nodes in the follower set can synchronize pausing the video at a frame corresponding to the pause frame identifier;
receiving, at the server, a seek video message from the first client node identifying a seek video event including a seek event time to seek a frame in the video at the first client node;
mapping, at the server, the seek event time to a seek frame identifier; and
sending, from the server, a follower seek video message to the one or more other client nodes in the follower set including the seek frame identifier, in response to which the one or more other client nodes in the follower set can synchronize seeking the video at a frame corresponding to the seek frame identifier;
receiving, at the server, a resume video message from the first client node identifying a resume video event including a resume event time to resume play of the video at the first client node;
mapping, at the server, the resume event time to a resume frame identifier; and
sending, from the server, a follower resume video message to the one or more other client nodes in the follower set including the resume frame identifier, in response to which the one or more other client nodes in the follower set can synchronize resuming play of the video at a frame corresponding to the resume frame identifier;
receiving, at the server, a stop video message from the first client node identifying a stop video event including a stop event time to stop play of the video at the first client node;
mapping, at the server, the stop event time to a stop frame identifier; and
sending, from the server, a follower stop video message to the one or more other client nodes in the follower set including the stop frame identifier, in response to which the one or more other client nodes in the follower set can synchronize stopping play of the video at a frame corresponding to the stop frame identifier;
receiving, at the server, an ask video message from an additional client node to enable synchronized playback of the video at the additional client node; and
sending, from the server, a next follower sync video message in a sequence of follower sync video messages to the additional client node, in response to which the additional client node can synchronize playing the video at a frame corresponding to the sync frame identifier;

receiving, at the server, a late video message from one of the client nodes in the follower set to synchronize playback of the video at the one of the client nodes in the follower set after the playback of the video has started on the first client node; and sending, from the server, a next follower sync video message in the sequence of follower sync video messages to the additional client node, in response to which the one of the client nodes in the follower set can synchronize playing the video at a frame corresponding to the sync frame identifier.

19. A method including:

sending, to a server and from a first client node, a sync video message identifying a sync video event including a sync event time, wherein playback of the video is to be synchronized to the sync event time at one or more other client nodes in a follower set;

receiving, from the server and at one or more of the other client nodes of the follower set, a follower sync video message including a sync frame identifier including a frame number within the video, the sync frame identifier included in the received follower sync video message being identified using a stored index table comprising sequential frame numbers and corresponding display time stamps for the video, each sequential frame number, of the sequential frame numbers, identifying a particular frame of the video, such that the stored index table is used to map the sync event time to the sync frame identifier including one sequential frame number of the sequential frame numbers within the video; and in response to the receiving of the follower sync video message, the one or more of the other client nodes in the follower set synchronizing the playback of the video at the frame corresponding to the frame number included in the received sync frame identifier.

20. A non-transitory computer readable storage medium impressed with computer program instructions, the instructions, when executed, implementing a method including:

sending, to a server and from a first client node, a sync video message identifying a sync video event including a sync event time, wherein playback of the video is to be synchronized to the sync event time at one or more other client nodes in a follower set;

receiving, from the server and at one or more of the other client nodes of the follower set, a follower sync video message including a sync frame identifier including a frame number within the video, the sync frame identifier included in the received follower sync video message being identified using a stored index table comprising sequential frame numbers and corresponding display time stamps for the video, each sequential frame number, of the sequential frame numbers, identifying a particular frame of the video, such that the stored index table is used to map the sync event time to the sync frame identifier including one sequential frame number of the sequential frame numbers within the video; and in response to the receiving of the follower sync video message, the one or more of the other client nodes in the follower set synchronizing the playback of the video at the frame corresponding to the frame number included in the received sync frame identifier.

* * * * *